United States Patent
D'Oria et al.

(10) Patent No.: US 11,403,455 B2
(45) Date of Patent: Aug. 2, 2022

(54) ELECTRONIC FORM GENERATION FROM ELECTRONIC DOCUMENTS

(71) Applicant: Kudzu Software, LLC, Roswell, GA (US)

(72) Inventors: Robert Thomas D'Oria, Dexter, MI (US); Eric Eichler, Cumming, GA (US); Ron Douglass, Roswell, GA (US)

(73) Assignee: Kudzu Software LLC, Roswell, GA (US)

( * ) Notice: Subject to any disclaimer, the term of this patent is extended or adjusted under 35 U.S.C. 154(b) by 0 days.

(21) Appl. No.: 16/922,971

(22) Filed: Jul. 7, 2020

(65) Prior Publication Data

US 2022/0012406 A1    Jan. 13, 2022

(51) Int. Cl.
*G06F 17/10* (2006.01)
*G06F 40/103* (2020.01)
*G06F 40/174* (2020.01)

(52) U.S. Cl.
CPC .......... *G06F 40/103* (2020.01); *G06F 40/174* (2020.01)

(58) Field of Classification Search
CPC .............................. G06F 40/103; G06F 40/174
See application file for complete search history.

(56) References Cited

U.S. PATENT DOCUMENTS

| | | | |
|---|---|---|---|
| 6,336,124 B1 | 1/2002 | Alam et al. | |
| 6,662,340 B2 * | 12/2003 | Rawat | G06F 16/972 715/236 |
| 6,816,630 B1 * | 11/2004 | Werth | G06F 40/18 382/287 |
| 6,952,803 B1 * | 10/2005 | Bloomberg | G06F 40/169 715/236 |
| 7,215,434 B1 * | 5/2007 | Janse | H04N 1/00397 358/1.15 |

(Continued)

OTHER PUBLICATIONS

Patent Cooperation Treaty, International Search Report and Written Opinion issued for PCT Application No. PCT/IB2021/055924, dated Oct. 28, 2021, 8 pages.

(Continued)

*Primary Examiner* — Shahid K Khan
(74) *Attorney, Agent, or Firm* — Norton Rose Fulbright US LLP

(57) ABSTRACT

In some aspects, a method for converting legacy electronic forms and static electronic documents to web-fillable electronic forms includes receiving data corresponding to an electronic document. The electronic document has an input file format. The method includes detecting one or more elements of the electronic document from the data based on a predetermined element interpretation rule set. The method includes generating an intermediate file representing an electronic form based on the data. The intermediate file includes metadata indicating the one or more elements and has an intermediate file format. The method includes displaying a user interface configured to enable user selection of a target output file format. The method also includes converting the intermediate file to an output file having the target output file format. The output file represents the electronic form configured to support user entry of information. The method further includes outputting the output file.

19 Claims, 13 Drawing Sheets

(56) References Cited

U.S. PATENT DOCUMENTS

| | | | |
|---|---|---|---|
| 7,725,834 B2* | 5/2010 | Bell | G06F 40/174 715/764 |
| 8,239,754 B1* | 8/2012 | Orthlieb | G06F 40/169 715/232 |
| 9,508,043 B1* | 11/2016 | Schlachter | G06F 40/174 |
| 9,928,230 B1* | 3/2018 | Jain | G06F 40/131 |
| 9,934,292 B2* | 4/2018 | Marum | G06F 16/248 |
| 2002/0041386 A1* | 4/2002 | Suzuki | H04N 1/00482 358/1.13 |
| 2003/0004971 A1* | 1/2003 | Gong | G06Q 10/087 |
| 2004/0093323 A1 | 5/2004 | Bluhm et al. | |
| 2004/0111675 A1* | 6/2004 | Mori | G06F 40/103 715/255 |
| 2004/0153462 A1 | 8/2004 | Bardwell | |
| 2004/0205622 A1 | 10/2004 | Jones et al. | |
| 2004/0268229 A1 | 12/2004 | Paoli et al. | |
| 2005/0094208 A1* | 5/2005 | Mori | G06F 40/166 358/1.18 |
| 2005/0160359 A1* | 7/2005 | Falk | G06F 40/143 715/239 |
| 2005/0210263 A1 | 9/2005 | Levas et al. | |
| 2006/0041484 A1* | 2/2006 | King | G06F 40/174 705/26.81 |
| 2006/0200763 A1* | 9/2006 | Michaelsen | G06F 40/151 715/244 |
| 2006/0278724 A1* | 12/2006 | Walker | G06F 40/103 235/494 |
| 2007/0106932 A1 | 5/2007 | Coar | |
| 2007/0168382 A1* | 7/2007 | Tillberg | G06K 9/00449 |
| 2007/0271085 A1 | 11/2007 | Hamdi et al. | |
| 2007/0277090 A1* | 11/2007 | Raja | G06F 40/18 715/212 |
| 2010/0179962 A1 | 7/2010 | Schuster | |
| 2010/0211866 A1 | 8/2010 | Nicholas et al. | |
| 2010/0251092 A1 | 9/2010 | Sun | |
| 2011/0026828 A1* | 2/2011 | Balasubramanian | G06K 9/00449 382/187 |
| 2011/0164813 A1* | 7/2011 | Enomoto | G06K 9/00449 382/164 |
| 2011/0255788 A1 | 10/2011 | Duggan et al. | |
| 2012/0137205 A1* | 5/2012 | Pandrangi | G06F 40/174 715/221 |
| 2012/0137207 A1 | 5/2012 | Heinz et al. | |
| 2013/0061124 A1 | 3/2013 | Patton et al. | |
| 2013/0124978 A1 | 5/2013 | Horns et al. | |
| 2015/0254227 A1* | 9/2015 | Lin | G06F 16/5846 715/219 |
| 2015/0278169 A1 | 10/2015 | Vanderport et al. | |
| 2016/0328137 A1 | 11/2016 | Brunswig et al. | |
| 2017/0228590 A1* | 8/2017 | Schlachter | G06F 40/131 |
| 2017/0236130 A1 | 8/2017 | Kee et al. | |
| 2017/0359403 A1 | 12/2017 | Brinkman et al. | |
| 2018/0285332 A1* | 10/2018 | Aghaiipour | G06F 40/143 |
| 2018/0336195 A1* | 11/2018 | Basu | G06F 3/1206 |
| 2019/0147028 A1 | 5/2019 | Hare et al. | |
| 2019/0340240 A1* | 11/2019 | Duta | G06F 40/177 |
| 2019/0370749 A1 | 12/2019 | Milvaney et al. | |
| 2020/0004808 A1 | 1/2020 | Yao et al. | |
| 2020/0162561 A1 | 5/2020 | Milvaney et al. | |
| 2020/0380202 A1 | 12/2020 | Cass et al. | |
| 2020/0387567 A1 | 12/2020 | Loforte et al. | |
| 2021/0012102 A1* | 1/2021 | Cristescu | G06F 16/56 |
| 2021/0089619 A1 | 3/2021 | Bhuyan et al. | |

OTHER PUBLICATIONS

"Transform Business Forms to K2 Smartforms"(K2 Webinar Series) Jul. 25, 2019 [online] [retrieved on Aug. 25, 2021]. Retrieved from the Internet <URL:https://www.youtube.com/watch?v=R_adOgXCxFo> entire document, especially 13:00-17:00; 7 pages.

Wempen. "Working with Fields and Forms in Word 2016." Word 2016 In Depth. Dec. 22, 2015; retrieved on Aug. 21, 2021 from <https://www.informit.com/articles/article.aspx?p=2455715&seqNum=8>; 8 pages.

Patent Cooperation Treaty, International Search Report and Written Opinion issued for PCT Application No. PCT/IB2021/055916, dated Sep. 28, 2021, 11 pages.

* cited by examiner

FIG. 4

Forms

☐ New ☐ Wizard ☐ Prettify ☐ Show Archived

| Name | Version | Category | Created | Created By | Modified | Modified By |
|---|---|---|---|---|---|---|
| ○ Conference Room | 1 | Demo Forms | May 25, 2020 | Admin | May 26, 2020 | Admin |
| ○ Health and Safety in the Construction Sector | 1 | Demo Forms | May 25, 2020 | Admin | May 26, 2020 | Admin |
| ○ HSCS | 1 | Demo Forms | May 25, 2020 | Admin | May 26, 2020 | Admin |
| ○ Close Visual Inspection Report | 1 | Demo Forms | May 25, 2020 | Admin | May 26, 2020 | Admin |
| ○ General Visual Inspection Report | 1 | Demo Forms | May 25, 2020 | Admin | May 26, 2020 | Admin |

Showing 1 to 5 of 5 entries

Previous  1  Next

Filters  [Apply]  [Reset]

Name
Room
Category
  Demo Form
Readers
  ☐ Image
  ☒ PDF
Writers
  ☐ HTML
  ☐ K2
  ☐ Sharepoint
Created
  05/01/01
Created By
  Bob  ☐ Me
Modified
  05/02/02
Modified By
  Admin  ☐ Me

[Apply]  [Reset]

FIG. 7

1100 e-form  1102

Health and Safety in the
Construction Sector Course 1104  1124

Date from: [    ]      Duration: 10 hours
Date to:   [    ]— 1106  Venue: 17, Edgar Ferro Street Please complete & submit this application form, enclosing the relative fee Company Details
Agency / Department / Company     1108
[                                      ]

Address                            1110
[                                      ]

VAT Number       1112    Telephone       1114
| XXX-XXXX-XXX |         | (XXX) XXX-XXXX |

Contact Person                     1116
[                                      ]

Position                           1118
[                                      ]

Email                              1120
[                                      ]

Application Date  1122
[        ]

*FIG. 11*

ELECTRONIC FORM GENERATION FROM ELECTRONIC DOCUMENTS

CROSS-REFERENCE TO RELATED APPLICATIONS

The present application is related to U.S. patent application Ser. No. 16/922,974 filed on Jul. 7, 2020, entitled "INTERACTIVE TOOL FOR MODIFYING AN AUTOMATICALLY GENERATED ELECTRONIC FORM," the contents of which are expressly incorporated herein by reference in their entirety.

TECHNICAL FIELD

The present subject matter is directed generally to applying layers of recognition (e.g., computer vision, text, shape, and form) to transform legacy electronic forms and static electronic documents to intelligent web-fillable electronic forms.

BACKGROUND

Forms are a common type of paper document. Typically, forms include multiple fields for a person to fill in with various information, such as a name, a date, an answer to a question, a description, or other information. If an enterprise wishes to have employees fill out a paper form, a copy of the form must be made for and provided to each employee, which can take significant amounts of time and resources, such as printer ink, paper, and the like. Additionally, if the form requests entry of sensitive information, the completed paper forms must be stored or destroyed (after obtaining the information contained therein) in a secure manner.

As data processing and electronic documents have evolved, many enterprises have transitioned from using paper forms to using electronic forms, also known as "smart forms." An electronic form or smart form refers to an electronic document that supports features such as electronic completion, dynamic sections, database calls, and electronic submission, among other features. For example, a user may enter information electronically into an electronic form using a computer, and by submitting the electronic form, the user may cause the entries in the electronic form to be provided to a database, server, or other network location for storage and/or additional processing.

Electronic forms may significantly reduce the amount of time and resources spent extracting information as compared to using paper forms. However, creating an electronic form is not an insignificant task. For example, a user may access an electronic document creation application to create an electronic form by entering text, creating and positioning data entry fields, creating and positioning user-configurable options such as buttons, checkboxes, date entries, and the like, designing tables for data entry, linking elements to data sources or databases, and configuring electronic submission protocols. As such, the electronic form creation process may be time consuming and pose additional costs to the enterprise. These costs may seem particularly burdensome when paper forms already exist, which may cause some enterprises to resist transitioning paper forms to electronic forms.

SUMMARY

The present disclosure provides systems, methods, and computer-readable media for generating a digital document that supports electronic completion (e.g., web-fillable completion), such as an electronic form, particularly from digital documents that do not already have metadata indicating elements of the document. For example, an electronic document may be a portable document format (pdf) file generated by scanning a print document, such as a paper form, or a document generated using a basic word processing or document creation application. To illustrate, the systems and methods described herein may detect one or more elements of the electronic document, such as text blocks, labels, fields, buttons, and/or tables, as non-limiting examples. Detection of the one or more elements may be based on a predetermined element interpretation rule set. For example, the predetermined element interpretation rule set may include rules for interpreting visual indicators (e.g., graphical features representing buttons, checkboxes, or other interactive elements), rules for interpreting dimensions or sizes of elements (e.g., rules that indicate a correspondence between a particular size or dimensions and a type of element), label threshold rules (e.g., rules for applying labels to fields based on distances), rules for detecting tables or repeating tables, rules for detecting data entry formats, text recognition rules (e.g., optical character recognition (OCR) rules), other types of rules, or a combination thereof. In this manner, the systems and methods described herein may be able to identify various types and other characteristics of elements in an electronic document that lacks metadata defining the elements. Alternatively, if the electronic document does include such metadata, the systems and methods described herein may extract the information related to the elements from the metadata, with reduced time and processing resources, as compared to automatically detecting the elements.

After detecting the elements, the systems and methods described herein may generate an intermediate file representing an electronic form based on the electronic document. For example, the intermediate file may include text extracted from the electronic document in addition to the detected elements. One or more of the detected elements may be converted or otherwise modified to an electronically-interactive format. For example, text corresponding to a selection between options, such as "yes/no," may be converted into a button or checkbox that is configurable electronically. As another example, a straight line indicating a location to write information may be converted into a field, such as a text box, that is user-fillable. Additional examples are described further within. The intermediate file may include metadata that indicates the detected elements, or information associated with the detected elements, such as labels, formats, dimensions, element types, and/or the like. The intermediate file has an intermediate file format. For example, the intermediate file format may be a "universal" proprietary file format that enables display and editing of the electronic form without restricting the electronic form to a particular file format.

After generating the intermediate file, the systems and methods described herein may display a user interface (UI) configured to enable user selection of a target output file format. For example, the UI may enable selection between a hypertext markup language (HTML) file, a proprietary output file format, or one or more output file formats supported by existing third-party electronic form applications. The intermediate file may be converted to an output file having the selected output file format to generate an output file representing the electronic form. For example, images or text of the electronic form may be formatted in accordance with rules associated with the output file format, the metadata may be modified or formatted in accordance with the rules, the elements may be adjusted or formatted in accordance with the rules, and/or data entry and electronic submission parameters may be set in accordance with the rules, as non-limiting examples. The output file may be output for electronic distribution to one or more users, such as via a network, an intranet, the Internet, etc. Thus, the techniques described herein enable generation of an electronic form from an electronic document, such as a pdf file of a scanned print document or another format of electronic document, that does not include metadata that indicates elements of the electronic document. The generation of the electronic form is performed automatically by the system, thereby reducing (or eliminating) manual input during the process.

In one particular aspect, a method for converting legacy electronic forms and static electronic documents to web-fillable electronic forms includes receiving data corresponding to an electronic document. The electronic document has an input file format. The method also includes detecting one or more elements of the electronic document from the data based on a predetermined element interpretation rule set. The method includes generating an intermediate file representing an electronic form based on the data. The intermediate file includes metadata indicating the one or more elements. The intermediate file has an intermediate file format. The method also includes displaying a user interface configured to enable user selection of a target output file format. The method includes converting the intermediate file to an output file having the target output file format. The output file represents the electronic form configured to support user entry of information. The method further includes outputting the output file.

In another aspect, an apparatus for converting legacy electronic forms and static electronic documents to web-fillable electronic forms may be provided. The apparatus includes a processor and a memory coupled to the processor. The memory stores instructions that are executable by the processor to cause the processor to receive data corresponding to an electronic document. The electronic document has an input file format. The instructions also cause the processor to detect one or more elements of the electronic document from the data based on a predetermined element interpretation rule set. The instructions cause the processor to generate an intermediate file representing an electronic form based on the data. The intermediate file includes metadata indicating the one or more elements. The intermediate file has an intermediate file format. The instructions also cause the processor to initiate display of a user interface configured to enable user selection of a target output file format. The instructions cause the processor to convert the intermediate file to an output file having the target output file format. The output file represents the electronic form configured to support user entry of information. The instructions further cause the processor to output the output file.

In yet another aspect, non-transitory computer-readable medium may be provided. The non-transitory computer-readable medium may store instructions that, when executed by a processor, cause processor to perform operations that include receiving data corresponding to an electronic document. The electronic document has an input file format. The operations also include detecting one or more elements of the electronic document from the data based on a predetermined element interpretation rule set. The operations include generating an intermediate file representing an electronic form based on the data. The intermediate file includes metadata indicating the one or more elements. The intermediate file has an intermediate file format. The operations also include initiating display of a user interface configured to enable user selection of a target output file format. The operations include converting the intermediate file to an output file having the target output file format. The output file represents the electronic form configured to support user entry of information. The operations further include outputting the output file.

The foregoing broadly outlines the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which:

FIGS. 4, 5A, 5B, and 6-10 show examples of user interfaces (UIs) for supporting operations of generating an electronic form according to some aspects of the present disclosure;

FIG. 11 shows an example of an electronic form generated according to some aspects of the present disclosure.

DETAILED DESCRIPTION

Various features and advantageous details are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure.

Figure 1:
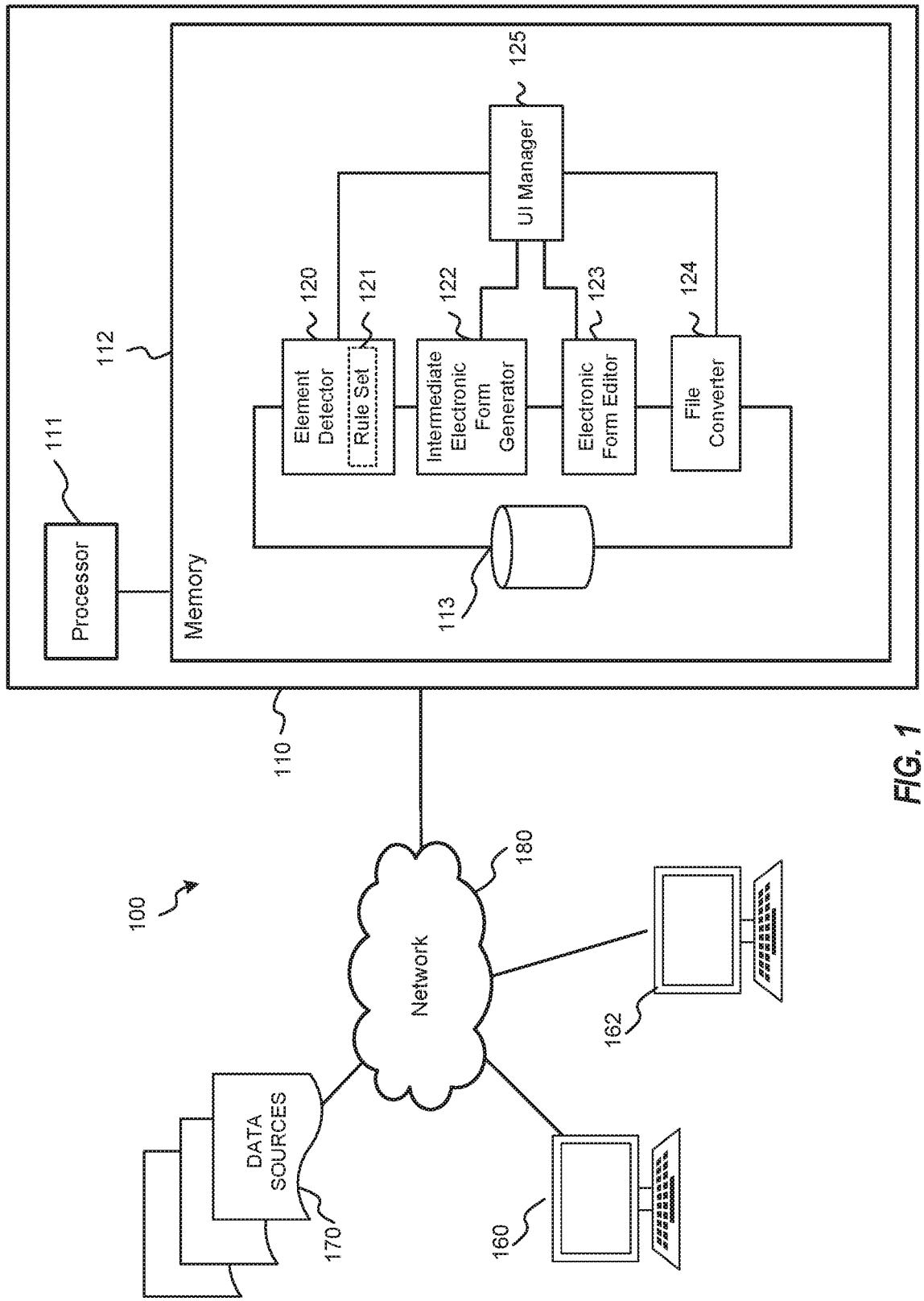
FIG. 1 shows a system configured to generate an electronic form based on an electronic document according to some aspects of the present disclosure.

FIG. 1 is a block diagram of an exemplary system 100 configured with capabilities and functionality for generating an electronic form (e.g., a web-fillable electronic form) based on an electronic document. As shown in FIG. 1, system 100 includes server 110, at least one user terminal 160, at least one output terminal 162, at least one data source 170, and network 180. These components, and their individual components, may cooperatively operate to provide functionality in accordance with the discussion herein. For example, in operation according to one or more implementations, data (e.g., corresponding to electronic documents) may be obtained from data sources 170 and may be provided as input to server 110. The various components of server 110 may cooperatively operate to perform generation of an electronic form from the data. For example, the various components of server 110 may cooperatively operate to detect one or more elements in the electronic document based on a predetermined element interpretation rule set. For example, the various components of server 110 may detect (and perform optical character recognition (OCR) on) text blocks, labels, input fields, buttons or other forms of interactive element, tables, other elements, or a combination thereof. The various components of server 110 may also generate an intermediate file representing an electronic form based on the electronic document (e.g., based on the detected elements). The intermediate file may be editable by a user of server 110 or at least one user terminal 160. The components of server 110 may enable, via presentation of a user interface (UI), user selection of a target output file format to which the intermediate file is converted to generate an output file. The output file may be stored or distributed to one or more other devices, such as at least one output terminal 162, for data entry by one or more recipients. As such, various aspects of the present disclosure allow generation of an electronic form from an electronic document that does not include metadata indicating elements of the electronic document, as further described herein. Additionally or alternatively, if an electronic document does contain such metadata, the components of server 110 may use the metadata to generate the intermediate file representing the smart form with minimal user input. Although described herein as generating an electronic form, the components of server 110 may be used to generate any type of electronic document that supports electronic completion and/or user interaction and electronic submission functionality.

It is noted that the functional blocks, and components thereof, of system 100 of implementations of the present invention may be implemented using processors, electronics devices, hardware devices, electronics components, logical circuits, memories, software codes, firmware codes, etc., or any combination thereof. For example, one or more functional blocks, or some portion thereof, may be implemented as discrete gate or transistor logic, discrete hardware components, or combinations thereof configured to provide logic for performing the functions described herein. Additionally or alternatively, when implemented in software, one or more of the functional blocks, or some portion thereof, may comprise code segments operable upon a processor to provide logic for preforming the functions described herein.

It is also noted that various components of system 100 are illustrated as single and separate components. However, it will be appreciated that each of the various illustrated components may be implemented as a single component (e.g., a single application, server module, etc.), may be functional components of a single component, or the functionality of these various components may be distributed over multiple devices/components. In such aspects, the functionality of each respective component may be aggregated from the functionality of multiple modules residing in a single, or in multiple devices.

In some aspects, server 110, user terminal 160, output terminal 162, and data sources 170 may be communicatively coupled via network 180. Network 180 may include a wired network, a wireless communication network, a cellular network, a cable transmission system, a Local Area Network (LAN), a Wireless LAN (WLAN), a Metropolitan Area Network (MAN), a Wide Area Network (WAN), the Internet, the Public Switched Telephone Network (PSTN), etc., that may be configured to facilitate communications between user terminal 160 and server 110 and/or between server 110 and output terminal 162.

User terminal 160 may be implemented as a mobile device, a smartphone, a tablet computing device, a personal computing device, a laptop computing device, a desktop computing device, a computer system of a vehicle, a personal digital assistant (PDA), a smart watch, another type of wired and/or wireless computing device, or any part thereof. User terminal 160 may be configured to provide a graphical user interface (GUI) via which a user may be provided with information related to data and information received from server 110. For example, user terminal 160 may display one or more GUIs from server 110. The one or more GUIs may facilitate user selection of an input file type, user selection of one or more parameters associated with detecting elements in an electronic document, editing of the electronic form, user selection of an output file type, or user selection of one or more parameters of a file conversion process, as illustrative, non-limiting examples. The selections or other user actions may be provided to server 110 from user terminal 160 as an input. Additionally or alternatively, the one or more GUIs may enable a user to view results of generating the electronic form (e.g., the intermediate file), a graphical representation of the electronic form, or results of converting the intermediate file to the target output file format, as non-limiting examples.

Output terminal 162 may be implemented as a mobile device, a smartphone, a tablet computing device, a personal computing device, a laptop computing device, a desktop computing device, a computer system of a vehicle, a PDA, a smart watch, another type of wired and/or wireless computing device, or any part thereof. Output terminal 162 may be configured to receive an output file from server 110 and to provide a GUI via which a user may enter information or otherwise interact with an electronic form represented by the output file. Additionally or alternatively, output terminal 162 may include or correspond to (or be replaced with) a network device, such as another server or a database, that is configured to store output files (e.g., electronic forms) for distribution to other terminal devices, such as via a private network, an intranet, the Internet, network 180, or any other type of network connection. In such implementations, output terminal 162 may additionally be configured to store input data received when users interact with the electronic form.

Data sources 170 may comprise at least one source of textual data, image data, or both, corresponding to one or more electronic documents. For example, the data source(s) may include a database or other electronic storage of electronic documents, such as forms, that have been scanned from physical documents or generated by a word processing or document creation application. In some implementations, data sources 170 may be owned or operated by an individual or an enterprise, and may be integrated within server 110 or accessible to server 110 via network 180, such as a network, WLAN, or an intranet, as non-limiting examples. Additionally or alternatively, data sources 170 may be owned or operated by a third party, and may be accessible via the Internet (or other network 180). For example, data sources 170 may include an online forms data source, a business data source, a legal compliance data source, a streaming data source, a database, a social media feed, a data room, another data source, the like, or a combination thereof. In some implementations, the data from data source 170 may include or correspond to one or more documents designed to be at least partially completed by a user, such as a form. In some implementations, the data from data source 170 does not include metadata that indicates elements of the electronic document, such as an electronic document that has been scanned from a physical document or created without such metadata by an application. In some other implementations, the data from data source 170 may include metadata that indicates elements of one or more electronic documents.

Server 110 may be configured to receive data from data sources 170, to apply customized text processing algorithms, image processing algorithms, rules-based analysis, machine learning algorithms, and/or other processing to generate an electronic form based on an electronic document. This functionality of server 110 may be provided by the cooperative operation of various components of server 110, as will be described in more detail below. Although FIG. 1 shows a single server 110, it will be appreciated that server 110 and its individual functional blocks may be implemented as a single device or may be distributed over multiple devices having their own processing resources, whose aggregate functionality may be configured to perform operations in accordance with the present disclosure. In some implementations, server 110 may be implemented, wholly or in part, on an on-site system, or on a cloud-based system.

As shown in FIG. 1, server 110 includes processor 111, memory 112, database 113, element detector 120, intermediate electronic form generator 122, electronic form editor 123, file converter 124, and user interface (UI) manager 125. It is noted that the various components of server 110 are illustrated as single and separate components in FIG. 1. However, it will be appreciated that each of the various components of server 110 may be a single component (e.g., a single application, server module, etc.), may be functional components of a same component, or the functionality may be distributed over multiple devices/components. In such aspects, the functionality of each respective component may be aggregated from the functionality of multiple modules residing in a single, or in multiple devices.

In some aspects, processor 111 may comprise a processor, a microprocessor, a controller, a microcontroller, a plurality of microprocessors, an application-specific integrated circuit (ASIC), an application-specific standard product (ASSP), or any combination thereof, and may be configured to execute instructions to perform operations in accordance with the disclosure herein. In some aspects, implementations of processor 111 may comprise code segments (e.g., software, firmware, and/or hardware logic) executable in hardware, such as a processor, to perform the tasks and functions described herein. In yet other aspects, processor 111 may be implemented as a combination of hardware and software. Processor 111 may be communicatively coupled to memory 112.

Memory 112 may comprise read only memory (ROM) devices, random access memory (RAM) devices, one or more hard disk drives (HDDs), flash memory devices, solid state drives (SSDs), other devices configured to store data in a persistent or non-persistent state, network memory, cloud memory, local memory, or a combination of different memory devices. Memory 112 may store instructions that, when executed by processor 111, cause processor 111 to perform operations in accordance with the present disclosure. In aspects, memory 112 may also be configured to facilitate storage operations. For example, memory 112 may comprise database 113 for storing one or more electronic documents, extracted text data, one or more predetermined element interpretation rule sets, detected element data, one or more intermediate files, an editing application, file type information, one or more conversion algorithms, one or more output files, input (e.g., from user terminal 160), other information, etc., which system 100 may use to provide the features discussed herein. Database 113 may be integrated into memory 112, or may be provided as a separate module. In some aspects, database 113 may be a single database, or may be a distributed database implemented over a plurality of database modules. In some embodiments, database 113 may be provided as a module external to server 110. Additionally, or alternatively, server 110 may include an interface configured to enable communication with data source 170, user terminal 160 (e.g., an electronic device), output terminal 162 (e.g., an electronic device), or a combination thereof.

Element detector 120 may be configured to detect one or more elements from the data corresponding to the electronic document. The data corresponding to the electronic document may be image data, such as a portable document format (pdf) file or other file format. The data may be generated by scanning a print document using a scanner, a camera, or another image capturing means, or the document may be electronically created (e.g., such as by a user operating a document creation and/or management application). In some implementations, the data does not include metadata, or any other type of information, indicating elements of the document, a structure of the document, markers in the document, or the like.

The detectable elements may include any type of element or component of a document, such as one or more text blocks, one or more labels, one or more fields (e.g., text input fields), one or more tables, one or more buttons, one or more check boxes, one or more particularly formatted fields (e.g., date fields, time fields, currency fields, signature fields, etc.), other elements, or a combination thereof. For example, a text block near another element may be a label, an empty line or box may be a text input field, a formation of text and lines in rows and columns may be a table, etc.

Element detector 120 may detect the elements in the electronic document based on a predetermined element interpretation rule set 121. For example, predetermined element interpretation rule set 121 may include rules for interpreting various detected objects, such as text, lines, shapes, etc., as elements based on characteristics such as position, distance relative to other objects, dimensions, object type, color, formatting, other characteristics, or a combination thereof. In some implementations, predetermined element interpretation rule set 121 includes text recognition rules, visual indicator detection rules, element dimension or size rules, label threshold rules, table detection rules, configurable element detection rules, signature detection rules, other rules, or a combination thereof. To illustrate, the text recognition rules may include one or more rules for performing optical character recognition (OCR) on text within the electronic document to generate text data (e.g., to "extract" the text data), such as character detection rules, space detection rules, word formation rules, lexical rules, sentence detection rules, etc. Alternatively, element detector 120 may perform OCR on the electronic document prior to performing element detection. As another example, the visual indicator detection rules may include rules for interpreting visual indicators as belonging to a particular element type, such as rules for interpreting a horizontal line with a particular amount of blank space above as an input field, rules for interpreting particular colors as corresponding to particular element types, or rules for interpreting particular shadings or pixel densities as corresponding to particular element types. As another example, the element dimension or size rules may include rules for interpreting shapes having particular dimensions or sizes, such as boxes or rectangles, as particular element types, such as input fields or tables, based on the dimensions or sizes. As another example, the label threshold rules may include rules indicating a threshold distance and/or direction between an indicator of an input field (or another element type) and a text block for use in interpreting the text block as a label of the input field (or other element type). The table detection rules may include rules for interpreting one or more boxes or rectangles or multiple parallel lines or multiple sets of perpendicular lines as a table based on positions relative to other boxes or rectangles or distances between parallel lines or alignment of intersections of perpendicular lines, rules for detecting a pattern of a table, and rules for interpreting a table as a repeating table based on empty entries (e.g., cells) within a table or multiple entries (e.g., rows or columns) that contain matching text. As another example, the configurable element detection rules may include rules for interpreting input fields within a threshold distance, input fields associated with labels indicating a selectable option (e.g., "Mark X or leave blank"), combinations of particular words (e.g., "Yes/No"), or other indicators as configurable elements, such as buttons or checkboxes. As another example, the signature detection rules may include rules for interpreting an input field as a signature field based on a position of the input field, dimensions of the input field, a label of the input field (or lack thereof), or other information. The above-described rules are illustrative and not to be considered limiting. In other implementations, predetermined element interpretation rule set 121 may include other types of rules. Performing element detection based on predetermined element interpretation rule set 121 is further described herein with reference to FIG. 2.

In some implementations, predetermined element interpretation rule set 121 is static. For example, predetermined element interpretation rule set 121 may be preprogrammed at server 110. Alternatively, one or more rules included in predetermined element interpretation rule set 121 may be dynamically selected from a group of stored element interpretation rules. For example, the one or more rules may be selected based on user selected parameters received responsive to display of a GUI, as further described herein. In this manner, predetermined element interpretation rule set 121 may enable server 110 (e.g., element detector 120) to detect elements in an electronic document that would otherwise require associated metadata or user-input indicating the elements to identify.

In some other implementations, the data corresponding to the electronic document includes metadata indicating elements included in the electronic document. For example, the metadata may include position information, element types, dimensions, formatting information, expected input information, links to external resources (e.g., databases), etc. In response to detecting the metadata, element detector 120 may detect the elements in the electronic document based on the metadata. Using the metadata to detect the elements may be faster and use less processing resources than detecting elements in the electronic document based on predetermined element interpretation rule set 121. In some implementations, element detector 120 may be configured to perform a pass on the electronic document based on predetermined element interpretation rule set 121 even if metadata is detected, to ensure that no elements are missed.

Intermediate electronic form generator 122 may be configured to generate an intermediate file representing an electronic form based on the data. For example, the smart form may be an electronic document that supports enhanced features, such as user completion (e.g., web-fillable completion), linkages to databases or other data sources, electronic submission, or a combination thereof. The electronic form may include the text, graphics, and other elements included in the received electronic document. However, in the electronic form, one or more elements may be converted into elements capable of user-manipulation or otherwise interactive elements. For example, a blank line for receiving text in the electronic document may be converted to a text box in the electronic form that is configured to display text based on received user input and to optionally re-size based on the amount of text. As another example, a field that indicated selection between two options (e.g., as signified by "Circle one: yes/no") may be replaced with a checkbox or a button. As yet another example, a field designated for receiving a date may be replaced by a calendar indicator that, when selected by a user, causes a pop-up window that includes a calendar with user-selectable dates.

The intermediate file has an intermediate file format. The intermediate file format may be a "uniform" file format that supports the features of an electronic form without being tied to any specific file format or electronic form application. In some implementations, the intermediate file format is a proprietary file format. The intermediate file format may include sufficient information (e.g., related to the elements of the electronic form) such that the intermediate file may be efficiently converted to one or more of multiple different output file types, as further described herein. Additionally, the electronic form represented by the intermediate file may be viewable and editable by an application, such as a proprietary electronic form manager application.

After generation of the intermediate file, the intermediate file may be provided to electronic form editor 123. Electronic form editor 123 may be configured to enable display of a graphical representation of the electronic form represented by the intermediate file. Additionally, electronic form editor 123 may be configured to enable the electronic form represented by the intermediate file to be edited based on user input. For example, a user (such as using user terminal 160), may be able to move elements, modify characteristics or properties of elements, add elements, delete elements, or make other edits to the electronic form. In some implementations, electronic form editor 123 may support such functionality in combination with one or more graphical user interfaces (GUIs) generated by UI manager 125.

File converter 124 may be configured to receive the intermediate file and to convert (e.g., publish) the intermediate file to an output file having a particular output file format. In some implementations, UI manager 125 may be configured to generate a GUI that enables user selection of a target output file format. In some other implementations, the particular output file format may be preset or preprogrammed, or selected based on a user that initiated the electronic form generation process or based on a destination for the output file. The particular output file format may be selected from one or more open source file formats, such as HTML, a proprietary electronic form file format (also referred to herein as "Vines" or "Kudzu Vines"), and/or one or more third-party supported electronic form file formats, such as K2 smart forms or SharePoint, as non-limiting examples. File converter 124 may be configured to convert the intermediate file into the output file using one or more conversion algorithms. For example, file converter 124 may be configured to format text, images, elements, metadata, links to external data, or other information from the intermediate file in accordance with formats, rules, or protocols associated with the output file format.

After generating the output file, file converter 124 may be configured to output the output file. For example, the output file may be output for storage, such as at database 113, an external database, data sources 170, or another storage location accessible via network 180. In some implementations, the output file may be made available for downloading to other devices, such as via network 180, the Internet, a private network of an enterprise, etc. Additionally or alternatively, the output file may be distributed to one or more other devices, such as output terminal 162, via network 180 for completion by one or more users. In some implementations, a customer (e.g., a user of user terminal 160) may contract to access server 110 to facilitate creation of electronic forms based on the customer's electronic documents (or publicly available electronic documents), such as from data sources 170. In some such implementations, the customer may provide user input, via user terminal 160, to select options of the electronic form generation process at server 110, to edit the electronic form represented by the intermediate file, to select options for the output format, or a combination thereof. In some other implementation, a customer may contract with a third party to generate electronic forms based on electronic documents, such as from data sources 170, for the customer. For example, an employee of the third party may use user terminal 160 to control one or more aspects of the electronic form generation process at server 110, and the output file may be provided to output terminal 162, which may be owned or operated by the customer.

UI manager 125 may be configured to generate one or more UIs, such as one or more GUIs, to display information and enable user selection of one or more parameters of the electronic form generation process. For example, UI manager 125 may be coupled to element detector 120, intermediate electronic form generator 122, electronic form editor 123, and file converter 124 to enable generation of UIs corresponding to the operations performed by each of the components 120-124. As an example, UI manager 125 may be configured to generate a UI configured to enable selection of a target output file format. As another example, UI manager 125 may be configured to generate a UI configured to enable user selection of one or more parameters associated with detection of the one or more elements by element detector 120. The one or more parameters may include one or more dimensions of input fields, one or more label thresholds, a type of indicator associated with the input fields, or a combination thereof. As another example, UI manager 125 may be configured to generate a UI configured to enable user configuration of the electronic form represented by the intermediate file. The UI may be part of a display initiated by electronic form editor 123 and may include an add option configured to add a field, an element, a control, or a combination thereof, to the electronic form, an edit option configured to edit one or more properties associated with one or more fields, one or more elements, one or more controls, or a combination thereof, included in the electronic form, a delete option configured to delete one or more fields, one or more elements, one or more controls, or a combination thereof, included in the electronic form, or a combination thereof. As another example, UI manager 125 may be configured to generate a UI configured to display measured results associated with generation of the intermediate file. The measured results may include a number of fields detected in the electronic document, a number of views detected in the electronic document, a percentage of detected views included in the electronic form, a percentage of detected fields included in the electronic form, a percentage of rules applied to generate the electronic form, a percentage of data sources linked to the electronic form, or a combination thereof. As another example, UI manager 125 may be configured to generate a UI configured to display one or more errors associated with generation of the intermediate file, one or more warnings associated with generation of the intermediate file, one or more to-do lists associated with generation of the intermediate file, or a combination thereof. Additional details regarding the UIs generated by UI manager 125 are further described with reference to FIGS. 4-10.

The database 113 may be coupled to element detector 120, intermediate electronic form generator 122, electronic form editor 123, file converter 124, UI manager 125, or a combination thereof. In some implementations, database 113 is configured to store one or more electronic documents (e.g., input files), extracted text data, one or more predetermined element interpretation rule sets, detected element data, one or more intermediate files, an editing application, file type information, one or more conversion algorithms, one or more output files (e.g., prior to distribution to output terminal 162), input (e.g., from user terminal 160), other information, or a combination thereof.

Figure 2:
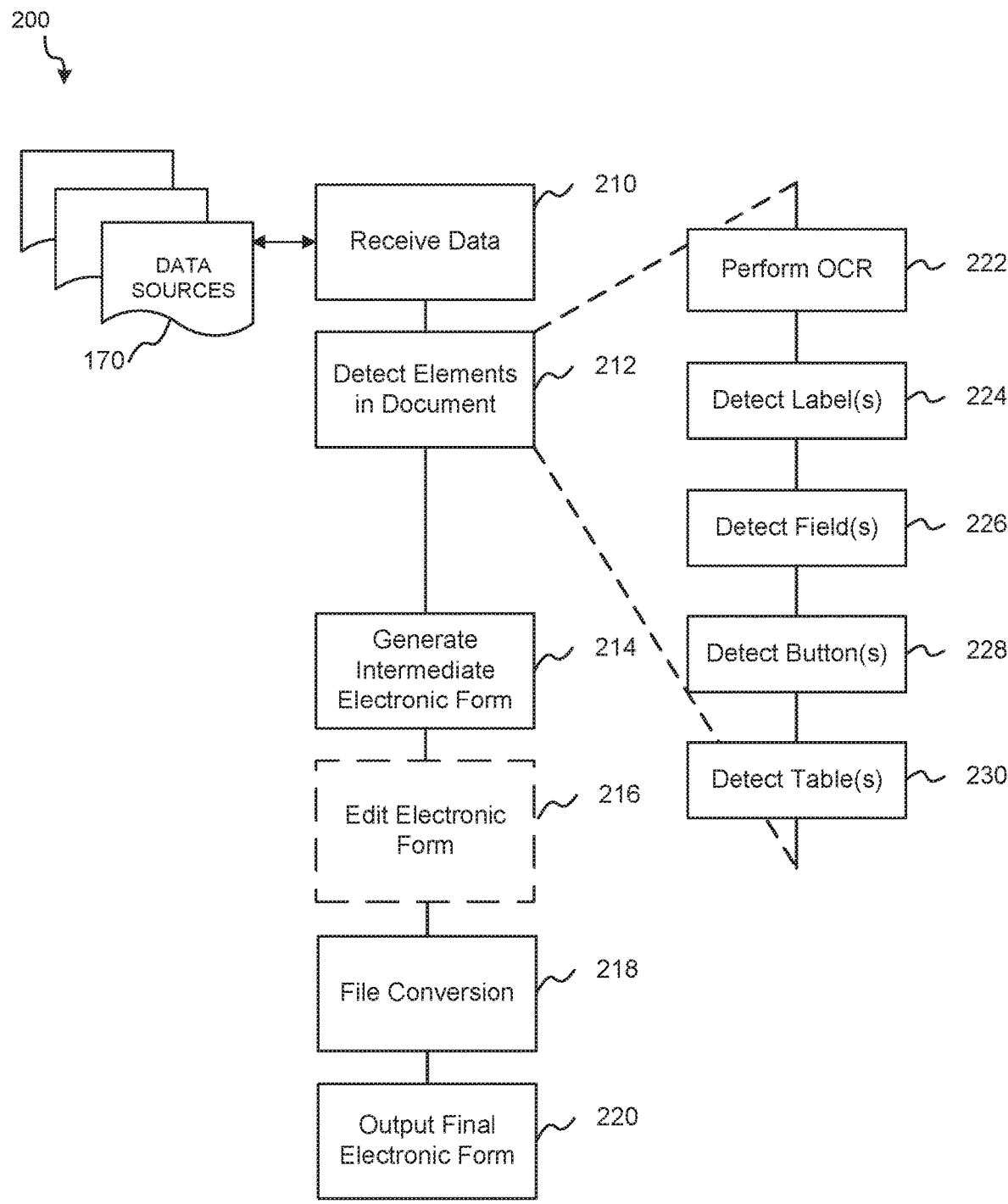
FIG. 2 shows a flow diagram illustrating functionality of the system of FIG. 1 implemented according to some aspects of the present disclosure.

The functionality of server 110 will now be discussed with respect to the block flow diagram illustrated in FIG. 2. FIG. 2 shows a flow diagram illustrating functionality of system 100 for generating an electronic form based on an electronic document. Blocks of method 200 illustrated in FIG. 2 may be performed by one or more components of system 100 of FIG. 1. For example, blocks 210, 212, and 222-230 may be performed by element detector 120, block 214 may be performed by intermediate electronic form generator 122, block 216 may be performed by electronic form editor 123, and blocks 218 and 220 may be performed by file converter 124. Generation of any UIs performed during the blocks may be performed by UI manager 125.

At block 210, data is received (e.g., at a receiver). For example, the data may include or correspond to an electronic document (or multiple electronic documents) and may be received from data sources 170. As described above, the data may not include metadata, or any other information, that indicates or identifies elements within the electronic document. The data corresponding to the electronic document may be image data, such as a pdf file or an image file, or another type of data, such as a word processing document. The data may be generated by scanning a print document using a scanner, a camera, or another image capturing means, or the electronic document may be electronically created (e.g., such as by a user operating a document creation and/or management application).

At block 212, one or more elements within the electronic document are detected. In some implementations, the electronic document (e.g., the data) does not include metadata that indicates or identifies elements within the electronic document. In such implementations, one or more elements are detected based on predetermined element interpretation rule set 121. In some other implementations, the electronic document (e.g., the data) includes such metadata, and one or more elements are detected or identified based on the metadata. To illustrate, the metadata may include positions, dimensions, and formats of input fields, positions, labels, and selectable options associated with checkboxes or buttons, positions, dimensions, numbers of rows, number of columns, and cell formatting associated with tables, links to external resources, other element information, and/or the like.

In some implementations in which the element detection is performed based on predetermined element interpretation rule set 121, the element detection may include one or more of the operations described with reference to blocks 222-230, other detection operations, or a combination thereof. To illustrate, any of the operations described with reference to blocks 222-230 may be performed based on one or more corresponding rules included in predetermined element interpretation rule set 121.

At block 222, optical character recognition (OCR) is performed on the data. Performing OCR may extract text data from the electronic document by recognizing characters, words, sentences, punctuation marks, other characters, or a combination thereof, from the electronic document. In some implementations, performing the OCR may include performing one or more preprocessing operations, one or more post-processing operations, or a combination thereof, to improve the accuracy of the extracted text data.

At block 224, label detection is performed. A text block may be identified as a label based on a comparison of a distance between the text block being and an input field indicator (e.g., a straight line, an empty box, etc.) to a threshold distance. For example, if the distance between a text block and an input field is less than or equal to (or less than) a threshold distance, the text block may be identified as a label associated with the input field. Alternatively, if the distance between the text block and the input field is greater than (or greater than or equal to) the threshold distance, the text block may be identified as an individual text block (or other element). In some implementations, the detection of a label may be further based on a position of a text block relative to an input field indicator. For example, if a text block is positioned horizontally to the left, or vertically above, the input field indicator, the text block may be identified as a label of the input field. Alternatively, if the text block is positioned horizontally to the right, vertically below, or diagonally from, the input field indicator, the text block may be identified as an individual text block (or other element). Additionally or alternatively, the detection of a label may be based on characteristics of the text included in a text block. For example, a text block including text having a particular text format (e.g., styles, such as bold or italics), a particular font color, or a particular font size (e.g., satisfying a threshold font size) may be identified as a label. Additionally or alternatively, a detection of a label may be based on detection of one or more keywords included in a text block. For example, if a text block includes one or more keywords, such as "signature," "date," "cost," "time," "result," "answer," "address," "phone number," "e-mail," etc., the text block may be identified as a label. The above-described examples are illustrative, in other implementations, labels may be detected using other techniques.

At block 226, field detection is performed. An input field may be identified based on detection of one or more particular graphical indicators. The graphical indicators may include shapes or objects detected in the electronic document, such as horizontal lines with blank space above, empty boxes or rectangles, or shaded regions, as non-limiting examples. In some implementations, characteristics, such as dimensions, of the detected object are compared to thresholds to determine whether the detected object is an input field. For example, if a length of a line satisfies a threshold and/or a vertical dimension of empty space above the line satisfies a threshold, the line may be identified as an input field. As another example, if a horizontal dimension of a box satisfies a threshold or exceeds a vertical dimension of the box, the box may be identified as an input field. Additionally or alternatively, an input field may be detected based on a detected object having an associated label. For example, if a horizontal line or box is associated with a detected label, the line or box may be identified as an input field. Additionally or alternatively, an input field may be detected based on a position of a detected object. For example, if a detected object has a particular position, such as within an empty cell of a table or at the bottom of a last page of the electronic document, the detected object may be identified as an input field. The above-described examples are illustrative, in other implementations, input fields may be detected using other techniques.

In some implementations, a type of input field may be detected for one or more identified input fields. The type of input field may be based on text included in a label associated with the input field. For example, if the label includes one or more keywords, such as "cost," "currency," "dollar amount," "payment," "$," etc., the input field may be identified as a currency field. As another example, if the label includes one or more keywords, such as "date," "day," "month," "year," etc., the input field may be identified as a data field. As another example, if the label includes one or more keywords, such as "time," "arrival," "departure," "clock-in," "clock-out," "check-in," "check-out," "second," "minute," "hour," etc., the input field may be identified as a time field. As another example, if the label includes one or more keywords, such as "signature," "name," "sign here," "endorse," etc., the input field may be identified as a signature field. Additionally or alternatively, the type of input field may be identified based on text included in a trailing text block. For example, if a text block is within a threshold distance to the right of the input field, and the text block includes one or more keywords indicating a type of unit, the type of input field may be identified. As an example, if a trailing text block includes "dollars," the input field may be identified as a currency field. As another example, if a trailing text block includes "AM," "PM," or "AM/PM," the input field may be identified as a time field. Other types of input fields may be identified, such as name fields, address fields, phone-number fields, e-mail fields, or identification (ID) number fields, as non-limiting examples.

At block 228, buttons, or other user-configurable or other interactive elements, are detected. The user-configurable or interactive elements may be detected based on one or more graphical indicators. For example, a square having particular dimensions may be identified as a check box. As another example, two (or more lines) each having a length that is shorter than a typical input field that are separated by a threshold distance, or a threshold distance and the word "or" or the characters " . . . " may indicate a group of input fields that can be converted into a button or dropdown menu. Additionally or alternatively, the user-configurable or interactive elements may be detected based on detection of keywords in a text block. For example, if a text block comprises one or more keywords, such as "yes/no," "agree/disagree," "approve/reject," etc., the text block may be converted into a check box or button. Additionally or alternatively, the user-configurable or interactive elements may be detected based on detection of keywords in a label or nearby text block. For example, if a label or nearby text block includes one or more keywords, such as "circle [NUMBER] of the following," "choose [NUMBER] of the following," "select [NUMBER] of the following," "mark each that apply," "pick one or more options," etc., the text block may be converted into one or more buttons or a dropdown menu. Additionally or alternatively, the user-configurable or interactive elements may be detected based on detection of a particular input field type. For example, a time field or a date field may be converted into a pop-up clock or a pop-up calendar in the electronic form, as further described herein. Additionally or alternatively, the user-configurable or interactive elements may be detected based on detection of a link. For example, a link (e.g., a uniform resource locator (URL), a file link, etc.) in the electronic document may be converted to content pointed to by the link, such as an image, a video, an audio file, an animation, other information, etc. The link may be identified based on the text (e.g., an address delineated by/s), based on a web address (e.g., http:// followed by additional text), and/or a particular keyword or shape predefined to indicate a link. The above-described examples are illustrative, in other implementations, user-configurable or interactive elements may be detected using other techniques.

At block 230, tables are detected. A table may be detected based on detection of multiple graphical indicators in the electronic document. For example, a table may be detected by detecting one or more boxes based on one or more rectangles. For example, if multiple rectangles (or squares) each having at least one side in contact with at least one side of an adjacent rectangle are detected, then the multiple rectangles may be identified as a table. Alternatively, a table may be detected by detecting boxes based on multiple sets of perpendicular lines. For example, if multiple parallel lines are each separated by no more than a threshold distance, and each of the multiple parallel lines is perpendicular to two or more perpendicular lines, boxes forming a table may be detected. Detecting a table may also include determining a pattern associated with the boxes in a horizontal direction, a vertical direction, or both. For example, a pattern of boxes having the same vertical dimension and located horizontally adjacent to one another may be determined to be a row, and a pattern of boxes having the same horizontal dimension and located vertically adjacent to one another may be determined to be a column. A grid may be built to represent the table. For example, the grid may represent the rows and columns of cells of the table. One or more entries in the table may be determined based on text included in the boxes, position of content included in the boxes, controls included in the boxes, or a combination thereof. For example, text in cells may be detected as labels or headers, in a similar manner to as described with reference to block 224. Additionally, blank cells may be detected as input fields. In some implementations, a compound header may be generated based on a type of entries in a row of a table and descriptors included in entries of an adjacent row of the table. For example, if a first row includes a header (e.g., "Totals), a second row includes labels (e.g., "Jan.," "Feb.," "March," and "April"), and a third row includes input fields, a compound header may be generated that replaces the first row and the second row and includes compound labels (e.g., Jan. Total," "Feb. Total," "March Total," and "April Total").

In some implementations, a table may be identified as a repeating table. A repeating table refers to a table that is designated to have additional rows (or columns) added based on the amount of information to be entered by a user. A repeating table may be detected based on one or more rows of empty entries or one or more rows having entries that include the same content. For example, multiple rows of empty cells without intervening labels may indicate a repeating table. As another example, multiple rows with cells having the same entries, such as "0.00" for a table of values or "name," "address," "phone number," and "e-mail," for a table of personal information. In some implementations, a child data source may be generated for a repeating table in the electronic form, such as a database entry or other type of data source, to store unknown amount of data to be entered into the repeating table.

After the elements in the electronic document are detected, at block 214, an intermediate electronic form is generated. For example, an intermediate file representing an electronic form may be generated based on the electronic document. The intermediate file has an intermediate file type. As described above, the intermediate file type may be a universal file type that supports electronic form functionality and is able to be efficiently converted to multiple different output file types.

The electronic form represented by the intermediate file includes electronic form elements corresponding to each of the detected elements in the electronic document. For example, for each text block in the electronic document, the electronic form may include extracted text data from the corresponding text block. As another example, for each input field detected in the electronic document, the electronic form may include an input field configured to receive user input. To illustrate, the input fields in the electronic form may be configured to display text received via user input. In some implementations, the input fields may be modified or enhanced to provide improved functionality. Such functionality may include displaying a default value that is replaced by user entered values. Such functionality may also include formatting entries in the input fields based on a type of the input field. To illustrate, a currency field may format entries as a $ sign, followed by one or more digits, followed by a decimal point, followed by two digits; a time field may format entries as one or two digits, followed by a colon, followed by two digits; an employee ID field may format entries as three digits, followed by a hyphen, followed by three digits, followed by a hyphen, followed by three digits, as non-limiting examples. As another example, text blocks and/or input fields may be converted into user-configurable or interactive elements, such as check boxes, buttons, and dropdown menus, as described above. Other interactive elements, such as a signature field that auto-populates with a digital signature associated with a user account used to access the electronic form, or other interactive elements, are also supported. As another example, input fields may be converted to include interactive elements to facilitate user input. For example, a date field may have an attached calendar icon that causes a calendar to pop-up and enable selection of a particular date, or a time field may have an attached clock icon that causes a clock to pop-up and enable selection of a particular time, as non-limiting examples. As another example, links may be replaced with the content pointed to by the links, such as images, text, video content, audio content, etc. As another example, the electronic form may include a table with one or more cells including input fields, or a repeating table, with one or more rows (or columns) of input fields, and a button to add additional rows (or columns) to the repeating table. The above-described examples are illustrative, in other implementations, other types of elements may be included in the electronic form.

The intermediate file may include metadata associated with each of the elements in the electronic form. The metadata may include position information, dimension information, type information, text data, interactivity information, formatting information, linking information, other information, or a combination thereof, associated with each element in the electronic form. The metadata may formatted in a manner that enables conversion to one or more output file types. In some implementations, the metadata may support additional functionality, such as navigation to different sections or elements of the electronic form, linking the electronic form to different data sources or documents, securing the electronic form, etc.

At block 216, editing of the electronic form may be enabled. For example, if a user selects an edit option, the electronic form may be displayed and the user may be able to edit or modify aspects of the electronic form, such as by using user terminal 160. For example, the user may be able to add additional elements to the electronic form or delete one or more elements from the electronic form. Additionally or alternatively, the user may be able to modify the position of elements within the electronic form. For example, the user may use a user input device to select an element and move the element to a new position within the electronic form. Additionally or alternatively, the user may able to edit parameters associated with the elements within the electronic form. For example, the user may modify text within a text block, label, input field, table, etc., the user may change visual properties associated with the elements (e.g., color, font, size, shading, rotation, alignment, etc.), the user may change a type of an element (e.g., change a check box to a button, a table to a repeating table, etc.), the user may modify properties of the elements (e.g., formatting, dimensions, input type, external links, etc.), or other modifications. The above-described examples are illustrative, in other implementations, the user may perform other types of document modifications.

At block 218, file conversion is performed. To illustrate, the intermediate file may be converted to an output file having an output file format. The output file format may be selected from one or more open source file formats, such as HTML, a proprietary electronic form file format, and/or one or more third-party supported electronic form file formats, such as K2 smart forms or SharePoint, as non-limiting examples. In some implementations, the output file format is user selected. For example, a UI may be displayed that enables a user to select the output file format from one or more supported file formats. Alternatively, the output file format may be preprogrammed or based on other information, such as a user ID of a user controlling the electronic form generation process or a distribution target of the output file, as non-limiting examples. Converting the intermediate file to the output file may include converting or formatting the metadata included in the intermediate file in accordance with one or more rules or protocols associated with the output file format. Additionally or alternatively, converting the intermediate file to the output file may include setting one or more submission parameters, such as a format of submitted data, a location for submitted data, etc., one or more security parameters, such as access credentials required to open or submit the electronic form, an encryption protocol used to encrypt the electronic form (or the submitted data), etc., or a combination thereof.

At block 220, the output file (e.g., representing the final version of the electronic form) is output. For example, the output file may be stored locally (e.g., at server 110, such as at database 113) or at a remote location via network 180. Additionally or alternatively, the output file may be distributed to one or more user devices, such as output terminal 162, or to a network location that enables downloading the output file to the one or more user devices.

As described with reference to FIG. 1, system 100 (e.g., server 110) and its corresponding operations and functions provide the ability to generate an electronic form from an electronic document that does not include metadata or other information that indicates elements of the electronic document. For example, elements may be detected in the electronic document (e.g., a pdf or other image file) based on a predetermined element interpretation rule set. Use of the predetermined element interpretation rule set to detect the elements of the electronic document may enable generation of an electronic form from a scanned document, or an electronic document created by a word processor or other basic document generation application. Additionally, an electronic form may be generated based on electronic documents that include metadata, thereby expanding the types of input files that can be used. After generation (e.g., in an intermediate file format) and optional user editing, the electronic form may be converted to one of multiple different electronic form file formats. Accordingly, the techniques of the present disclosure may be implemented to generate electronic forms, from many different types of electronic documents and for systems that implement different types of electronic form formats, in less time and with reduced manual input, than other types of electronic form applications.

Figure 3:
FIG. 3 shows an example of an electronic document according to some aspects of the present disclosure.

FIG. 3 depicts an example of an electronic document 300 according to some aspects of the present disclosure. In the particular example shown in FIG. 3, the electronic document is a course completion form (e.g., for a "Health and Safety in the Construction Sector Course"). In other implementations, the electronic document may be any type of form or document that is designed to be filled out by a user. In some implementations, electronic document 300 is a scanned copy of a physical document. In some other implementations, electronic document 300 is generated by a word processing or document creation/management application. In some implementations, electronic document 300 does not include metadata indicating elements of electronic document 300. In some other implementations, electronic document 300 includes at least some metadata indicating elements of electronic document 300.

In the particular example shown in FIG. 3, electronic document 300 includes a header 302, a first input text box 304, a first label 306, a second input text box 308, and a second label 310. Header 302 may include or correspond to a title of electronic document 300, such as "Health and Safety in the Construction Sector Course," as a non-limiting example shown in FIG. 3. First input text box 304 is a box (e.g., a rectangle) designed for a user filling out electronic document 300 to enter information into. First label 306 includes a text block including information identifying or otherwise associated with first input text box 304. In the particular example of FIG. 3, first label 306 includes the text "Date from:", indicating that first input text box 304 is a date field. Similarly, second input text box 308 is another box designed for the user to enter information into, and second label 310 includes a text block including information identifying or otherwise associated with second input text box 308. In the particular example of FIG. 3, second label 310 includes the text "Agency/Department/Company", indicating that second input text box 308 is company name field. Electronic document 300 may include additional elements, such as another date field (e.g., a "Date from:" field), an address field, a VAT number field, a telephone number field, a contact person field, a position field, other information (e.g., "Duration: 10 hours, Venue: 17, Edgar Ferro Street"), and instructions (e.g., "Please complete and submit this application form, enclosing the relative fee"). Other information and elements may also be included in other implementations.

During an electronic form generation process based on electronic document 300, one or more of the elements may be detected. For example, first input text box 304 may be detected based on identification of a rectangle with no text inside. First label 306 may be detected based on first label 306 being within a threshold distance to the left of first input text box 304. Additionally, second input text box 308 may be detected based on identification of another rectangle with no text inside. Second label 310 may be detected based on second label 310 being within a threshold distance above second input text box 308. Header 302 may be detected based on a position of header 302, a font size of the text of header 302, other characteristics, or a combination thereof. Other elements may be similarly detected, as further described with reference to FIGS. 1-2.

FIGS. 4-10 depict examples of UIs (e.g., GUIs) for supporting operations of generating an electronic form according to some aspects of the present disclosure. In some implementations, the UIs shown in FIGS. 4-10 may be generated by UI manager 125 of FIG. 1 during generation of an electronic form based on electronic document 300 of FIG. 3.

FIG. 4 shows a first UI 400. First UI 400 may include or correspond to a system menu. First UI 400 may include one or more stored electronic forms 402. First UI 400 may display, for each of stored electronic forms 402, a document name and associated information, such as a version number, a category, a creation date, a creation user ID, a most recent modification date, and a most recent modification user ID, as non-limiting examples. If more electronic forms are stored than can be displayed at one time, first UI 400 may include one or more buttons, such as a "Previous" button, a "Next" button, and one or more page buttons to enable navigation among the one or more stored electronic forms 402.

First UI 400 may also include electronic form display options 404. Electronic form display options 404 may include one or more selectable indicators that enable display (or hiding) of various electronic forms. In some implementations, electronic form display options 404 include a new option to enable display of new electronic forms, a wizard option to enable display of electronic forms available through a wizard, a prettify option to enable display of electronic forms that have been "prettified" (e.g., visually enhanced), and a show archived option to enable display of archived electronic forms. In other implementations, electronic form display options 404 may include fewer options than shown in FIG. 4, more options than shown in FIG. 4, or different options than shown in FIG. 4.

First UI 400 may also include a filter option window 406. Filter option window 406 may include a first button to apply selected filter(s) and a second button to reset the selected filter(s). Filter option window 406 may also include filter options that may be configurable to filter display of one or more stored electronic forms 402. In the example shown in FIG. 4, the filter options include a name field, a category field, a readers (e.g., input file format) field, a writers (e.g., output file format) field, a creation date field, a creation user ID field, a most recent modification field, and a most recent modification user ID field. In other implementations, the filter options may include fewer options than shown in FIG. 4, more options than shown in FIG. 4, or different options than shown in FIG. 4. One or more of the filter options may be configured based on user input to control filtering of the display of one or more stored electronic forms 402. As a non-limiting example, a date may be entered into the creation date field to cause first UI 400 to display only electronic forms that were created on that date.

Selection of one of the one or more stored electronic forms 402 may cause one or more additional UIs to be displayed. The one or more additional UIs may display additional information associated with the selected electronic form or may enable one or more operations with respect to the selected electronic form, such as editing of the selected electronic form, data entry in the selected electronic form, distribution of the selected electronic form, other operations, or a combination thereof.

Figure 5A:
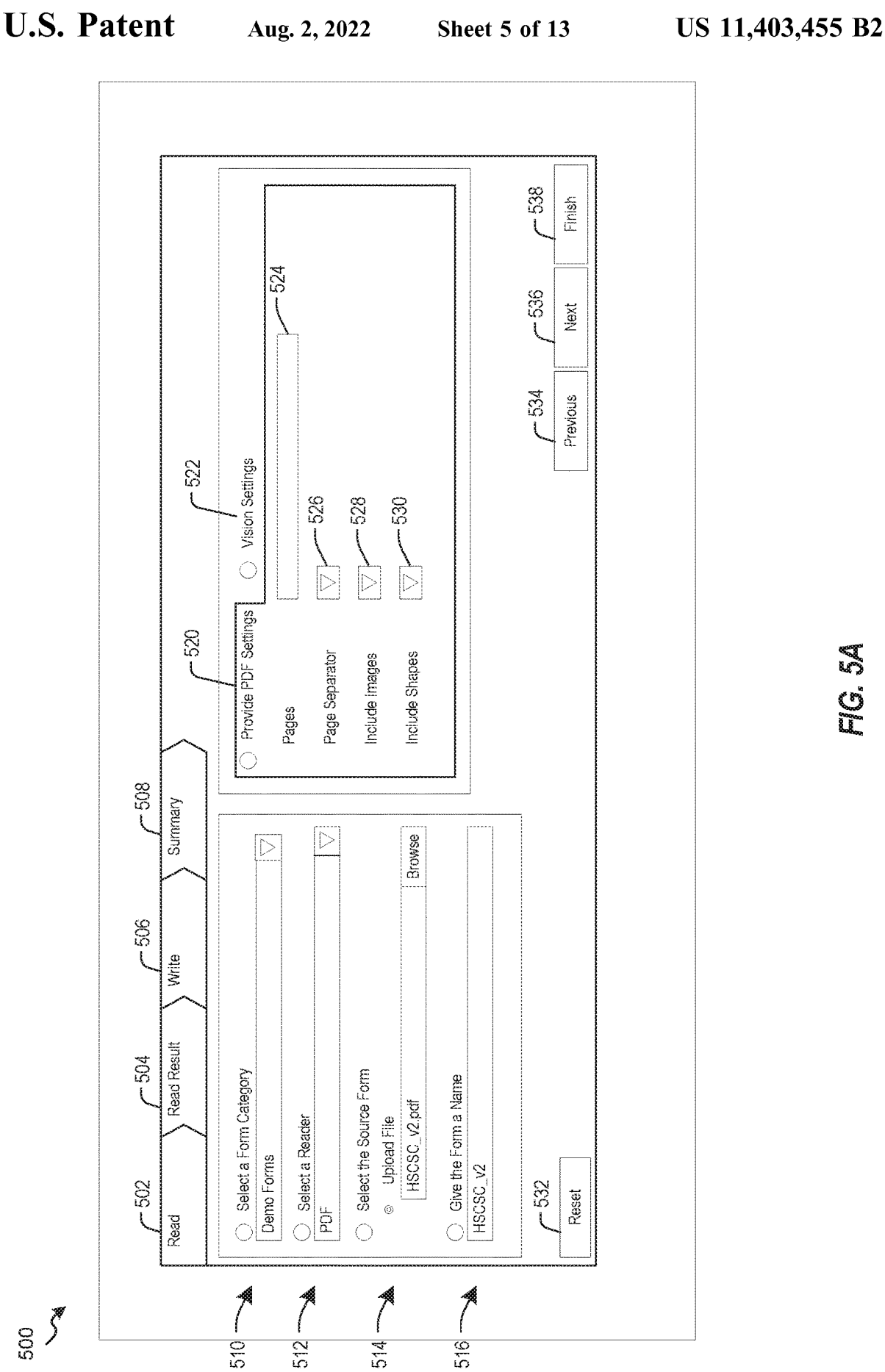

FIG. 5A shows a second UI 500. Second UI 500 may include or correspond to an input file selection window, which may be a first window of an electronic form generation process. For example, second UI 500 may be displayed when a user initiates an electronic form generation process for a new electronic form. Second UI may include multiple window indicators, including a first window indicator 502 ("Read"), a second window indicator 504 ("Read Result"), a third window indicator 506 ("Write"), and a fourth window indicator 508 ("Summary"). First window indicator 502 may correspond to an input file selection window (e.g., second UI 500), second window indicator 504 may correspond to a read results window, as further described with reference to FIG. 6, third window indicator 506 may correspond to an output file selection window, as further described with reference to FIG. 8, and fourth window indicator 508 may correspond to a summary window, as further described with reference to FIG. 9.

Second UI 500 includes multiple input file selection options associated with the new electronic form. In the particular example shown in FIG. 5A, the input file selection options include a category selection option 510, a reader selection option 512 (e.g., input file format selection option), a source file selection option 514, and a form name selection option 516. Category selection option 510 may enable selection of a category to be associated with the electronic form. Reader selection option 512 may enable selection of a reader to be used to read an input file for generation of the electronic form. For example, a reader may correspond to an input file format, such as a PDF file or an image file, as non-limiting examples. Source file selection option 514 may enable selection of the input file to be used to generate the electronic form. Form name selection option 516 may enable selection of a name for the electronic form. The input file selection options 512-516 may be configured based on user input (e.g., text), selection of an option via a dropdown menu, or selection of a file via a browse button.

Second UI 500 also includes multiple settings that are configurable via selection of multiple tabs. For example, FIG. 5A illustrates settings associated with selection of a reader settings tab 520. Settings associated with selection of a vision settings tab 522 are described with reference to FIG. 5B. FIG. 5A illustrates settings associated a selected reader. In the example of FIG. 5A, the reader has been selected as PDF, so the settings are PDF-specific. In other implementations, other reader-specific settings are shown based on selection of a different type of reader (e.g., input file format).

In the particular example of FIG. 5A, the reader settings include a pages setting 524, a page separator setting 526, an include images setting 528, and an include shapes setting 530. Pages setting 524 may enable selection of a particular page, or a particular group or range of pages, of the input file to be used to generate the electronic form. Page separator setting 526 may enable inclusion of a page separator between pages of the electronic form. Include images setting 528 may enable inclusion of images from the input file in the electronic form. Include shapes setting 530 may enable inclusion of shapes from the input file in the electronic form. The above-described settings are illustrative, in other implementations, fewer settings, more settings, or different settings may be included.

Second UI 500 also includes a reset button 532 and one or more navigation buttons. Reset button 532, when selected, may cause the input file selection options and the additional settings to be reset to default selections. The one or more navigation buttons may include a previous button 534, a next button 536, and a finish button 538. Previous button 534, when selected, may cause display of a previous window corresponding to one of window indicators 502-508. Next button 536, when selected, may cause display of a next window corresponding to one of window indicators 502-508. Finish button 538, when selected, may finish the electronic form generation process.

Figure 5B:

FIG. 5B shows second UI 500 after selection of vision settings tab 522. Vision settings tab 522 displays one or more parameters (e.g., settings) associated with detection of one or more elements in the input file. The one or more parameters may include one or more dimensions of input fields, one or more label thresholds, a type of indicator associated with the input fields, or a combination thereof.

To illustrate, the vision settings may include general recognition settings 540, input recognition settings 550, and label recognition settings 552. General recognition settings 540 may include one or more settings associated with computer vision and detection operations to be performed on the input file. For example, general recognition settings 540 may include an enablement option 542, an override option 544, a detect tables option 546, and a detect repeating tables option 548. Enablement option 542 may enable detection of one or more elements in the input file, such as text blocks, input fields, labels, etc. Override option 544 may override the default detection settings. Detect tables option 546 and detect repeating tables option 548 may enable detection of tables, and repeating tables, as described with reference to FIG. 2. Input recognition settings 550 may include one or more settings associated with recognizing input fields, such as dimensions of input fields, types of indicators (e.g., blank lines, boxes, etc.) associated with input fields, other input field settings, or a combination thereof. Label recognition settings 552 may include one or more settings associated with recognizing labels, such as a threshold distance between a label and an input field, permissible directions of the label with respect to the input field, dimensions of the label, other label settings, or a combination thereof. The above-described settings are illustrative, and in other implementations, the vision settings may include fewer settings, more settings, or different settings.

Figure 6:
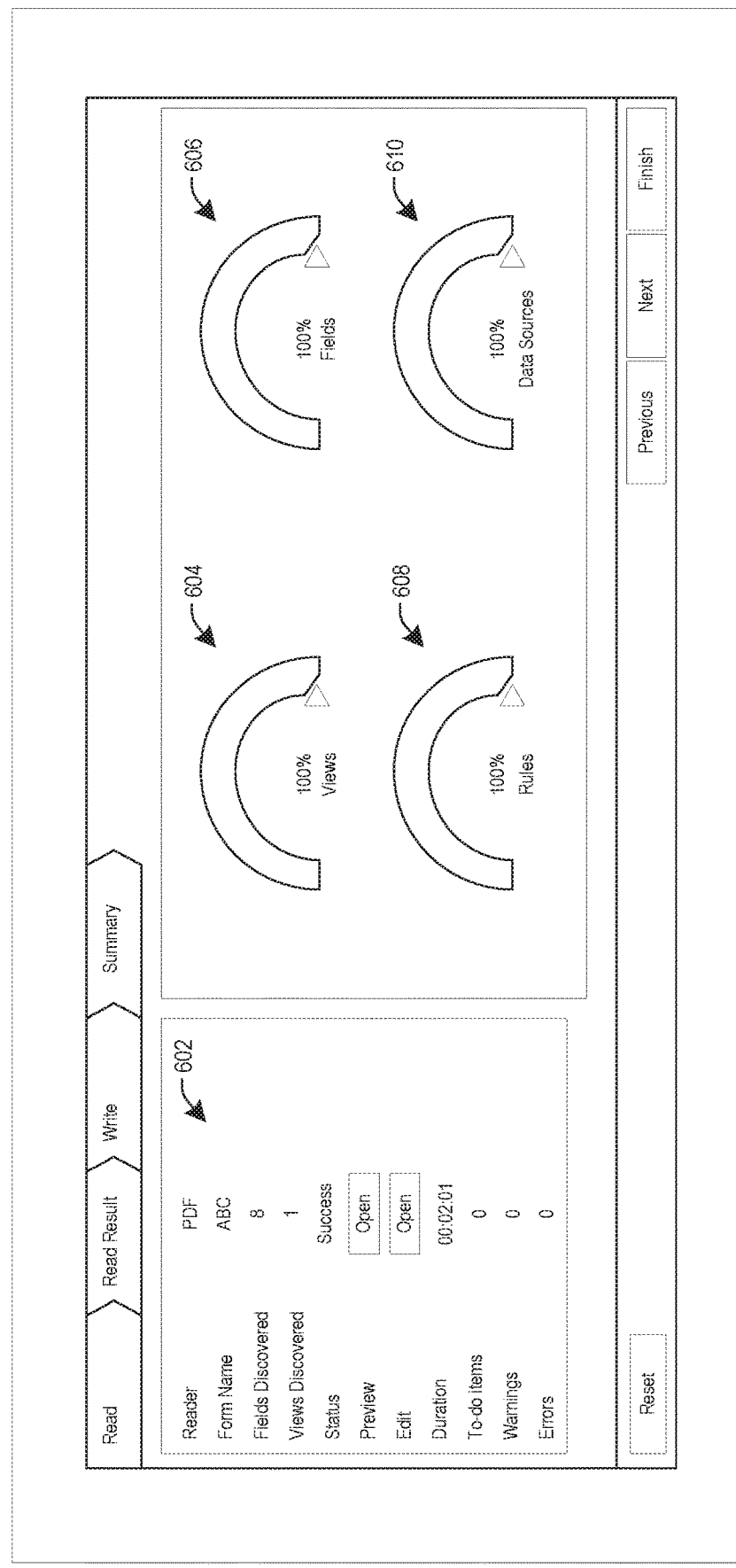

FIG. 6 shows a third UI 600. Third UI 600 may include or correspond to a read results window. The read results window may display results of generation of an intermediate file (e.g., an electronic form represented by a file having the intermediate file format) based on the input file. The read results (e.g., measured results) may include a number of fields detected in the electronic document, a number of views detected in the electronic document, a percentage of detected views included in the electronic form, a percentage of detected fields included in the electronic form, a percentage of rules applied to generate the electronic form, a percentage of data sources linked to the electronic form, or a combination thereof.

To illustrate, third UI 600 may include electronic form generation results 602. Electronic form generation results 602 may include one or more results of generating the intermediate file (e.g., representing the electronic form). For example, electronic form generation results 602 may include a reader used to read the input file (e.g., corresponding to an input file format), a form name of the electronic form, a number of fields detected in the input file, a number of views (e.g., container(s) or groupings of various elements) detected in the input file, a status of the electronic form generation (e.g., success if the electronic form is generated or failure if the electronic form is unable to be generated), a preview option for the electronic form, an edit option for the electronic form, a duration of the electronic form generation process, a number of to-do items associated with the electronic form, a number of warnings associated with the electronic form, a number of errors associated with the electronic form, other results associated with the electronic form, or a combination thereof. In the example of FIG. 6, no to-do items, warnings, or errors are detected, however, if any to-do items, warnings, or errors are detected, the to-do items, warnings, and errors may be displayed via a popup window or another GUI. The above-described results are illustrative, and in other implementations, electronic form generation results 602 may include fewer results than shown in FIG. 6, more results than shown in FIG. 6, or different results than shown in FIG. 6. Selection of the preview option may cause display of another UI configured to enable viewing of the electronic form, and selection of the edit option may cause display of another UI configured to enable editing of the electronic form, as further described with reference to FIG. 7.

Third UI 600 may also include one or more graphical indicators configured to indicate results of generating the electronic form based on the input file. In some implementations, the graphical indicators include a first graphical indicator 604 (e.g., a "Views" indicator), a second graphical indicator 606 (e.g., a "Fields" indicator), a third graphical indicator 608 (e.g., a "Rules" indicator), and a fourth graphical indicator 610 (e.g., a "Data Sources" indicator). First graphical indicator 604 may display a percentage of views detected in the input file that are included in the electronic form. For example, first graphical indicator 604 may include a semi-circle corresponding to percentages from 0-100, and an arrow may indicate the percentage of the views that are included in the electronic form (e.g., 100% in the example of FIG. 6). A numerical percentage value may also be displayed. Second graphical indicator 606 may display a percentage of fields detected in the input file that are included in the electronic form. Third graphical indicator 608 may display a percentage of the rules from the input file that are applied to the electronic form. Fourth graphical indicator 610 may indicate a percentage of selected data sources that are linked to the electronic form. Although four graphical indicators are illustrated in FIG. 6, in other implementations, fewer than four graphical indicators, more than four graphical indicators, or different graphical indicators may be displayed. Third UI 600 may also include a reset button and one or more navigation buttons, as described with reference to FIG. 5A.

Figure 7:
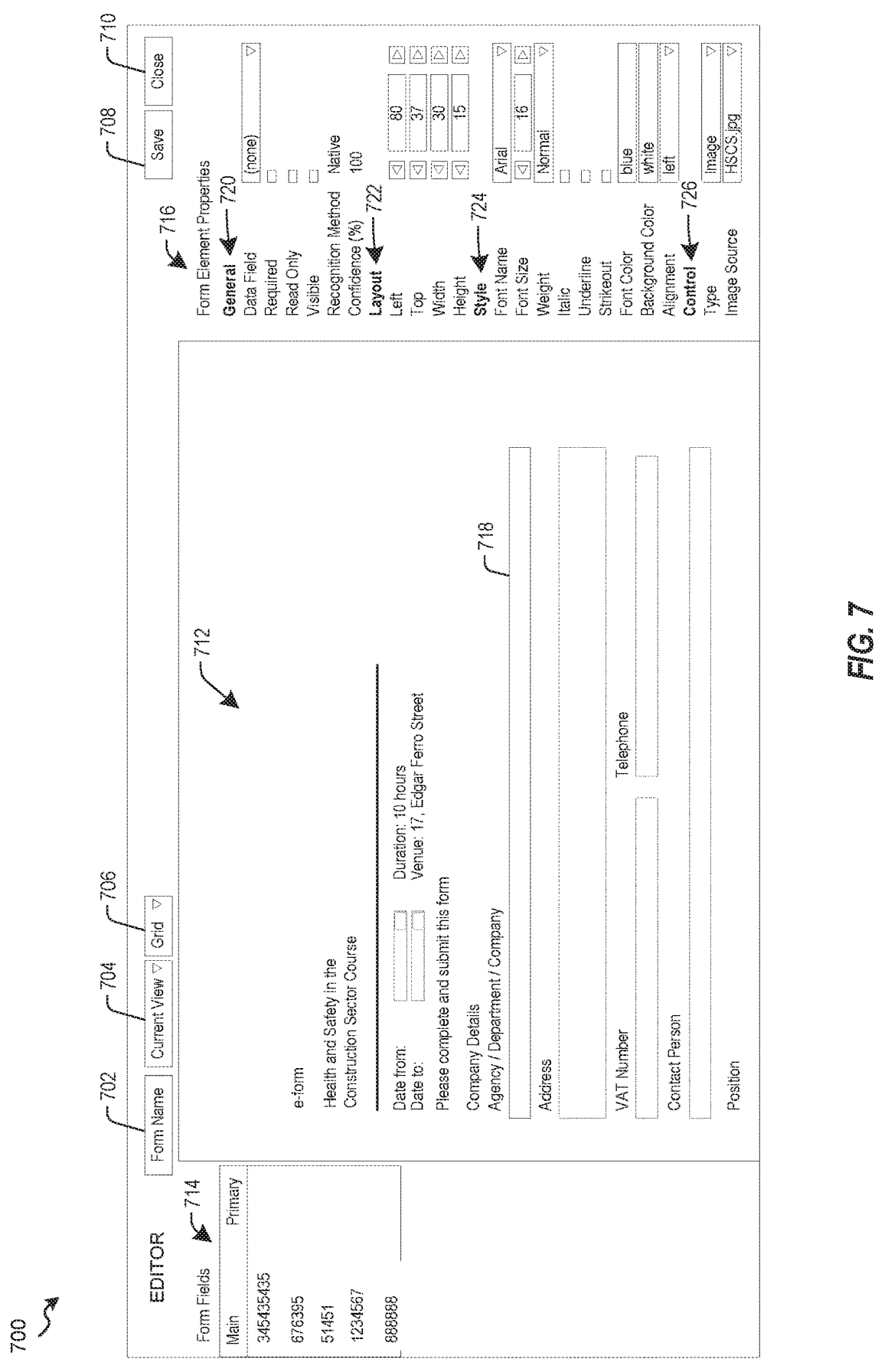

FIG. 7 shows a fourth UI 700. Fourth UI 700 may include or correspond to an electronic form editor. The electronic form displayed in FIG. 7 may correspond to an electronic form generated based on electronic document 300 of FIG. 3. Fourth UI 700 may be configured to enable user configuration of the electronic form represented by the intermediate file. For example, a user may interact with fourth UI 700, such as via one or more user input devices, to modify one or more aspects of the generated electronic form.

Fourth UI 700 may include buttons 702-710, a display pane 712, a list of form fields 714, and form element properties 716. The buttons may include buttons that enable control of general settings or operations associated with fourth UI 700. For example, the buttons may include a form name button 702, a view button 704, a grid button 706, a save button 708, and a close button 710. Form name button 702 may display the form name of the electronic form and, via selection of form name button 702, may enable the electronic form to be renamed. View button 704 may enable selection of one or more different views for display pane 712, such as a current view, a full-screen view, one or more zoomed views, a split view, or another type of view. Grid button 706 may enable a grid to be displayed (or hidden) on display pane 712. Save button 708 may enable any modifications made to the electronic form to be saved (e.g., to update the intermediate file). Close button 710 may close the electronic form editor and return to the next window of the electronic form generation procedure.

Display pane 712 may be configured to display at least a portion of the electronic form represented by the intermediate file. The displayed electronic form may include electronic form elements, such as text blocks (e.g., a header ("Health and Safety in the Construction Sector Course"), instructions ("Please complete and submit this form"), additional information ("Duration: 10 hours" "Venue: 17, Edgar Ferro Street"), etc.), input fields (e.g., date fields, company name field, address field, VAT number field, telephone number field, contact field, etc.), labels associated with the input fields ("Date from:", "Date to:", "Agency/Department/Company", "Address", "VAT Number", "Telephone", "Contact Person", "Position", etc.), interactive elements (e.g., calendar icons included in the date fields), other types of electronic form elements, or a combination thereof, as further described with reference to FIGS. 1-2. In some implementations, fourth UI 700 includes an add option configured to add a field, an element, a control, or a combination thereof, to the electronic form, an edit option configured to edit one or more properties associated with one or more fields, one or more elements, one or more controls, or a combination thereof, included in the electronic form, a delete option configured to delete one or more fields, one or more elements, one or more controls, or a combination thereof, included in the electronic form, or a combination thereof. For example, fourth UI 700 may include one or more buttons (not shown for convenience) that enable adding, editing, or deleting elements of the electronic form. Additionally or alternatively, options to add, edit, or delete elements of the electronic form may be displayed via a popup list or menu that is displayed in response to a particular user input, such as right clicking within display pane 712 using a mouse. Additionally or alternatively, elements of the electronic form may be modified via operations performed with respect to display pane 712. For example, a position of an element may be changed by selecting the element and moving the element to a new position (e.g., such as via a click and drag operation using a mouse or a touchpad). As another example, text of an element may be changed by selection of a text block and receipt of a user entry indicating new or modified text for the text block. As yet another example, an element may be modified by selecting the element and adjusting one or more properties of form element properties 716.

List of form fields 714 includes a list of identifiers of the various fields included in the electronic form. Selection of one of the field identifiers from list of form fields 714 may cause selection (e.g., highlighting) of the corresponding field in display pane 712. Although the field IDs are illustrated as numeric values, in other implementations, the field IDs may be any alphabetic, numeric, or alphanumeric value that identifies the various fields.

Form element properties 716 may indicate one or more properties of selected element 718 within display pane 712. In the example of FIG. 7, selected element 718 is the company name input field. Form element properties 716 may include general properties 720, layout properties 722, style properties 724, control properties 726, other properties, or a combination thereof. In some implementations, the properties displayed by form element properties 716 are specific to the element type associated with selected element 718. General properties 720 may include a data formatting property (e.g., a particular type of input field associated with selected element 718, such as a date field, a time field, a currency field, etc.), a required property (e.g., whether selected element 718 is required to be completed for submission of the electronic form), a read only property (e.g., whether selected element 718 is read only), a visibility property (e.g., whether selected element 718 is visible in the electronic form), other general properties, or a combination thereof. Layout properties 722 may include a left position (e.g., an x-coordinate of a left-most pixel of selected element 718), a top position (e.g., a y-coordinate of a top-most pixel of selected element 718), a width of selected element 718, a height of selected element 718, other layout properties, or a combination thereof. Style properties 724 may include a font property (e.g., a font of text associated with selected element 718), a font size property (e.g., a font size of text associated with selected element 718), a weight property (e.g., a weight of text associated with selected element 718), an italic property (e.g., whether text associated with selected element 718 is italicized), an underline property (e.g., whether text associated with selected element 718 is underlined), a strike-out property (e.g., whether text associated with selected element 718 is strike-through), a font color property (e.g., a font color of text associated with selected element 718), a background color property (e.g., a background color of text associated with selected element 718), an alignment property (e.g., an alignment of text associated with selected element 718), other style properties, or a combination thereof. Control properties 726 may include a type property (e.g., whether selected element 718 corresponds to an image, a video, a link, an interactive element, or another element type) and an image source property (e.g., a source of the selected element type), other control properties, or a combination thereof. Form element properties 716 may be configurable by user input (e.g., text from a user), one or more dropdown menus, one or more checkboxes or buttons, one or more incrementing or decrementing values, or a combination thereof, as non-limiting examples. The above-described properties are illustrative, and in other implementations, form element properties 716 may include fewer properties than shown in FIG. 7, more properties than shown in FIG. 7, or different properties than shown in FIG. 7.

Figure 8:
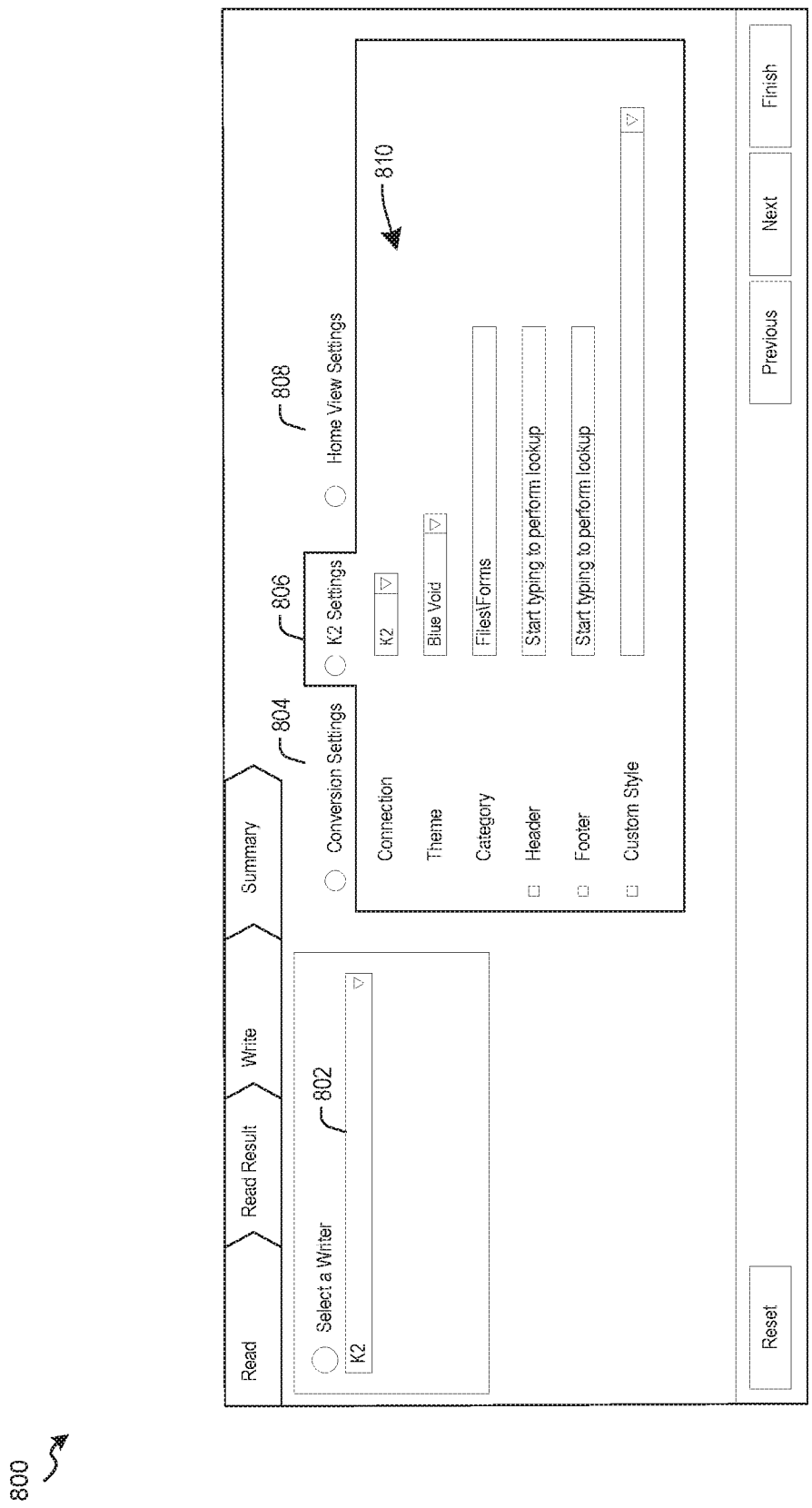

FIG. 8 shows a fifth UI 800. Fifth UI 800 may include or correspond to an output file selection window. Fifth UI 800 may be configured to enable user selection of a target output file format. For example, the output file format may include or correspond to an open source, proprietary, or third-party supported electronic form application, and the intermediate file having the intermediate file format may be converted into an output file having the output file format and that represents the electronic form, as described with reference to FIGS. 1-2.

Fifth UI 800 may include a writer selection option 802. Writer selection option 802 may enable user selection of a writer (e.g., an output file format) for the output file. The output format may be one of HTML, Vines, K2, or SharePoint, as non-limiting examples. In some implementations, writer selection option 802 may include a dropdown menu that includes all the different output file formats that are supported.

Fifth UI 800 also includes multiple settings that are configurable via selection of one or more tabs. In some implementations, the tabs are specific to the selected writer (e.g., output file format). In some other implementations, at least one tab is common to all writers (e.g., output file formats). In the particular example of FIG. 8, the tabs include a conversion settings tab 804, a writer-specific settings tab 806, and a home view settings tab 808. Conversion settings tab 804 may include one or more conversion settings, such as an output file name, an output file category, one or more element conversion settings (e.g., if the selected output file format does not support all element types of the intermediate file format), other conversion settings, or a combination thereof. Writer-specific settings tab 806 may include one or more writer-specific (e.g., output file format-specific) settings 810, such as a connection setting, a theme setting, a category setting, a header, a footer, a custom style setting, other writer-specific settings, or a combination thereof. In the particular example of FIG. 9, the selected writer is K2, and the writer-specific settings are K2-specific settings. Home view settings tab 808 may include one or more home view settings, such as an initial zoom setting associated with the electronic form, an initial center of the displayed electronic form, one or more initial options displayed be an application that executes the electronic form, other home view settings, or a combination thereof. The above-describe settings are illustrative, and in other implementations, may include fewer settings that shown in FIG. 8, more settings than shown in FIG. 8, or different settings than shown in FIG. 8. Fifth UI 800 also includes a reset button and one or more navigation buttons, as described with reference to FIG. 5A.

Figure 9:
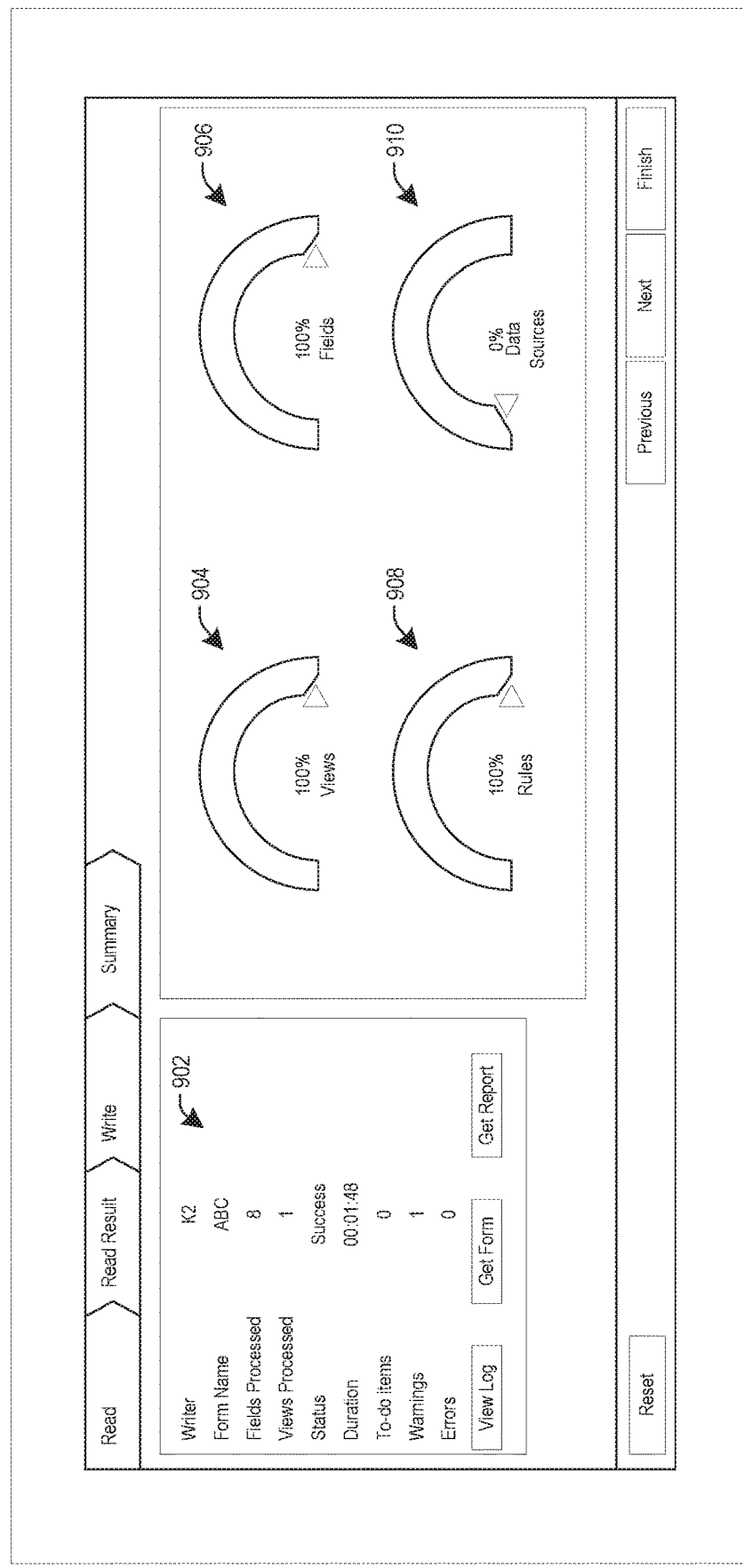

FIG. 9 shows a sixth UI 900. Sixth UI 900 may include or correspond to a summary window. Sixth UI 900 may be configured to display one or more writer results (e.g., measured results) associated with generation of the output file (e.g., conversion of the intermediate file having the intermediate file format to the output file having the output file format).

Sixth UI 900 may include output file generation results 902. Output file generation results 902 may include one or more results of generating the output file (e.g., representing the electronic form and having the output file format). For example, output file generation results 902 may include a writer used to write (e.g., generate) the output file (e.g., corresponding to the output file format), a form name of the electronic form, a number of fields processed from the intermediate file, a number of views processed from the intermediate file, a status of the output file generation (e.g., success if the output file is generated or failure if the output file is unable to be generated), a duration of the output file generation process, a number of to-do items associated with the output file, a number of warnings associated with the output file, a number of errors associated with the output file, other results associated with the output file, or a combination thereof. In some implementations, the to-do items, warnings, or errors are described in a popup window or another UI, as further described with reference to FIG. 10. The above-described results are illustrative, and in other implementations, output file generation results 902 may include fewer results than shown in FIG. 9, more results than shown in FIG. 9, or different results than shown in FIG. 9.

Sixth UI 900 may also include one or more graphical indicators configured to indicate results of generating the output file based on the intermediate file. In some implementations, the graphical indicators include a first graphical indicator 904 (e.g., a "Views" indicator), a second graphical indicator 906 (e.g., a "Fields" indicator), a third graphical indicator 908 (e.g., a "Rules" indicator), and a fourth graphical indicator 910 (e.g., a "Data Sources" indicator). First graphical indicator 904 may display a percentage of views from the intermediate file that are included in the output file. For example, first graphical indicator 904 may include a semi-circle corresponding to percentages from 0-100, and an arrow may indicate the percentage of the views that are included in the output file (e.g., 100% in the example of FIG. 9). A numerical percentage value may also be displayed. Second graphical indicator 906 may display a percentage of fields from the intermediate file that are included in the output file. Third graphical indicator 908 may display a percentage of the rules from the intermediate file that are applied to the output file. Fourth graphical indicator 910 may indicate a percentage of selected data sources linked to the intermediate file that are also linked to the output file. Although four graphical indicators are illustrated in FIG. 9, in other implementations, fewer than four graphical indicators, more than four graphical indicators, or different graphical indicators may be displayed. Sixth UI 900 also includes a reset button and one or more navigation buttons, as described with reference to FIG. 5A.

Figure 10:
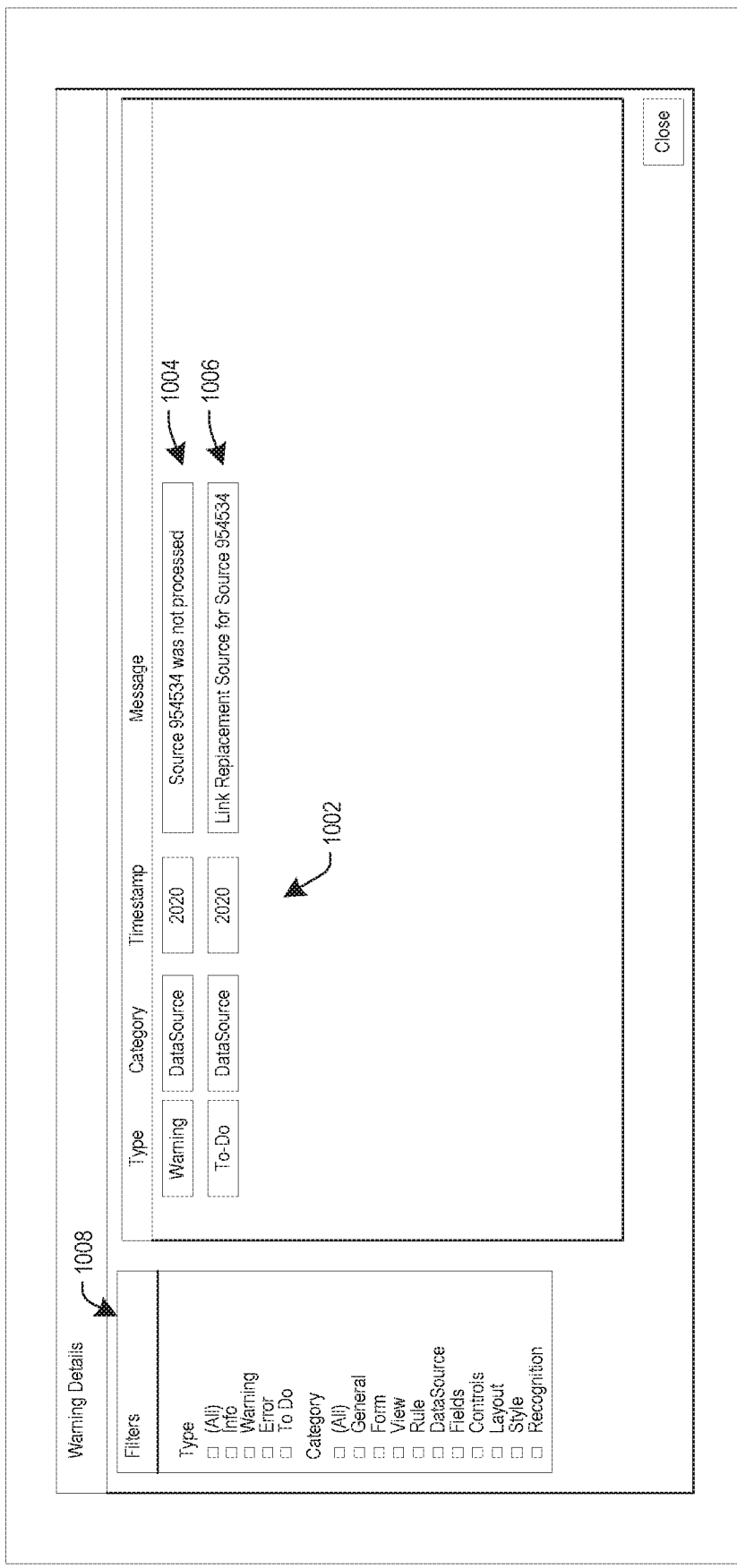

FIG. 10 shows a seventh UI 1000. Seventh UI 1000 may include or correspond to a to-do/warnings/errors window. For example, seventh UI 1000 may be configured to display one or more errors associated with generation of the output file, one or more warnings associated with generation of the output file, one or more to-do lists associated with generation of the output file, or a combination thereof.

To illustrate, seventh UI 1000 may include a list 1002 of information items, to-do items, warnings, and errors associated with generation of the output file. Each entry in list 1002 may include multiple details associated with the entry, such as a type of the entry (e.g., informational element, to-do item, warning, or error), a category associated with the entry, a timestamp indicating when the entry was created, a message included in the entry, other information, or a combination thereof. In the particular example of FIG. 10, list 1002 includes a warning 1004 and a to-do item 1006. Warning 1004 may be associated with the category "DataSource," may have a timestamp indicating "2020," and may include a message "Source 954534 was not processed." To-do item 1006 may be associated with the category "DataSource," may have a timestamp indicating "2020," and may include a message "Link Replacement Source for Source 954534." The information elements may indicate information related to generation of the output file that is relevant to a user. The to-do elements may indicate one or more actions for a user to take in order to finalize the output file for distribution or use. For example, to-do item 1006 indicates that a replacement data source should be linked to the output file to replace source 954534. The warnings may indicate one or more potential problems associated with distribution or use of the output file. For example, warning 1004 indicates that data source 954534 was not processed. The errors may indicate one or more errors that resulted in failure of generation of the output file. The above-described examples are illustrative, and in other implementations, list 1002 may include fewer details than shown in FIG. 10, more details than shown in FIG. 10, or different details that shown in FIG. 10.

Seventh UI 1000 may also include filter options 1008. Filter options 1008 may include one or more options for filtering entries displayed in list 1002. For example, filter options 1008 may include one or more options for displaying particular entries, one or more options for hiding particular entries, or both. In some implementations, filter options 1008 may include one or more type options and one or more category options. The type options may include an all option configured to enable display of all entries included in list 1002, an info option configured to enable display of the information elements included in list 1002, a warning option configured to enable display of the warnings included in list 1002, an error option configured to enable display of the errors included in list 1002, and a to-do option configured to enable display of the to-do elements included in list 1002. The category options may include options configured to enable display entries corresponding to each type of category, such as all categories, general, form, view, rule, datasource, fields, controls, layouts, style, and recognition. The above-described options are illustrative, and in other implementations, filter options 1008 may include fewer options than shown in FIG. 10, more options than shown in FIG. 10, or different options than shown in FIG. 10. Seventh UI 1000 also includes a close button that enables closing of seventh UI 1000.

FIG. 11 depicts an example of an electronic form 1100 generated according to some aspects of the present disclosure. In some implementations, electronic form 1100 may be represented by the output file generated by file converter 124 of FIG. 1.

In the particular example shown in FIG. 11, electronic form 1100 includes a header 1102, a first date field 1104, a second date field 1106, a company name field 1108, an address field 1110, a VAT number field 1112, a phone number field 1114, a contact field 1116, a position field 1118, an e-mail field 1120, and a third date field 1122. Header 1102 may include or correspond to a title of electronic form 1100, such as "Health and Safety in the Construction Sector Course," as a non-limiting example shown in FIG. 11. Additional text may also be included in electronic form 1100, such as instructions (e.g., "Please complete & submit this application form, enclosing the relative fee"), additional information (e.g., "Duration: 10 hours" and "Venue: 17, Edgar Ferro Street"), and labels corresponding to the fields 1104-1122.

One or more elements of electronic form 1100 may include enhanced functionality as compared to electronic document 300 of FIG. 3. As an example, one or more of fields 1104-1122 may be formatted to receive particular input. To illustrate, date fields 1104, 1106, and 1122 may be formatted to receive dates as inputs. To further illustrate, VAT number field 1112 may be formatted to receive a VAT number, which may be a 10-digit number separated by a hyphen after the third digit and a hyphen after the seventh digit, and phone number field 1114 may be formatted to receive a phone number, such as three digits in parenthesis, followed by seven digits separated by a hyphen after the third digit. Additionally or alternatively, one or more elements of electronic form 1100 may include interactive elements. To illustrate, one or more fields may have an interactive icon that, when selected, enables a popup window (or other interactive function) to enable entry of information into the field. For example, first date field 1104 may include a calendar icon 1124 that, when selected by a user of electronic form 1100, initiates display of a popup window containing a calendar that enables the user to select a date in the calendar, and first date field 1104 auto-populates with the date selected in the correct format. Second date field 1106 and third date field 1122 may include similar respective calendar icons. Other types of elements, enhanced elements, interactive elements, etc., may be included in electronic form 1100, as described with reference to FIGS. 1-2.

As described with reference to FIGS. 1-2, electronic form 1100 (or the output file representing electronic form 1100) may include metadata indicating the elements of electronic form 1100. The metadata may indicate element types, dimensions, positions, properties, interactive operations, linked data sources, or other information associated with the elements. As an example, the metadata may indicate the position of each of the fields 1104-1122. As another example, the metadata may indicate the date formatting and the interactive calendar icons of date fields 1104, 1106, and 1122, or the number formatting of VAT number field 1112 or phone number field 1114. As another example, if electronic form 1100 includes a signature field, the metadata may indicate a link to a digital signature of a device that is executing electronic form 1100. Other information may be included in or indicated by the metadata, as described with reference to FIGS. 1-2.

Figure 12:
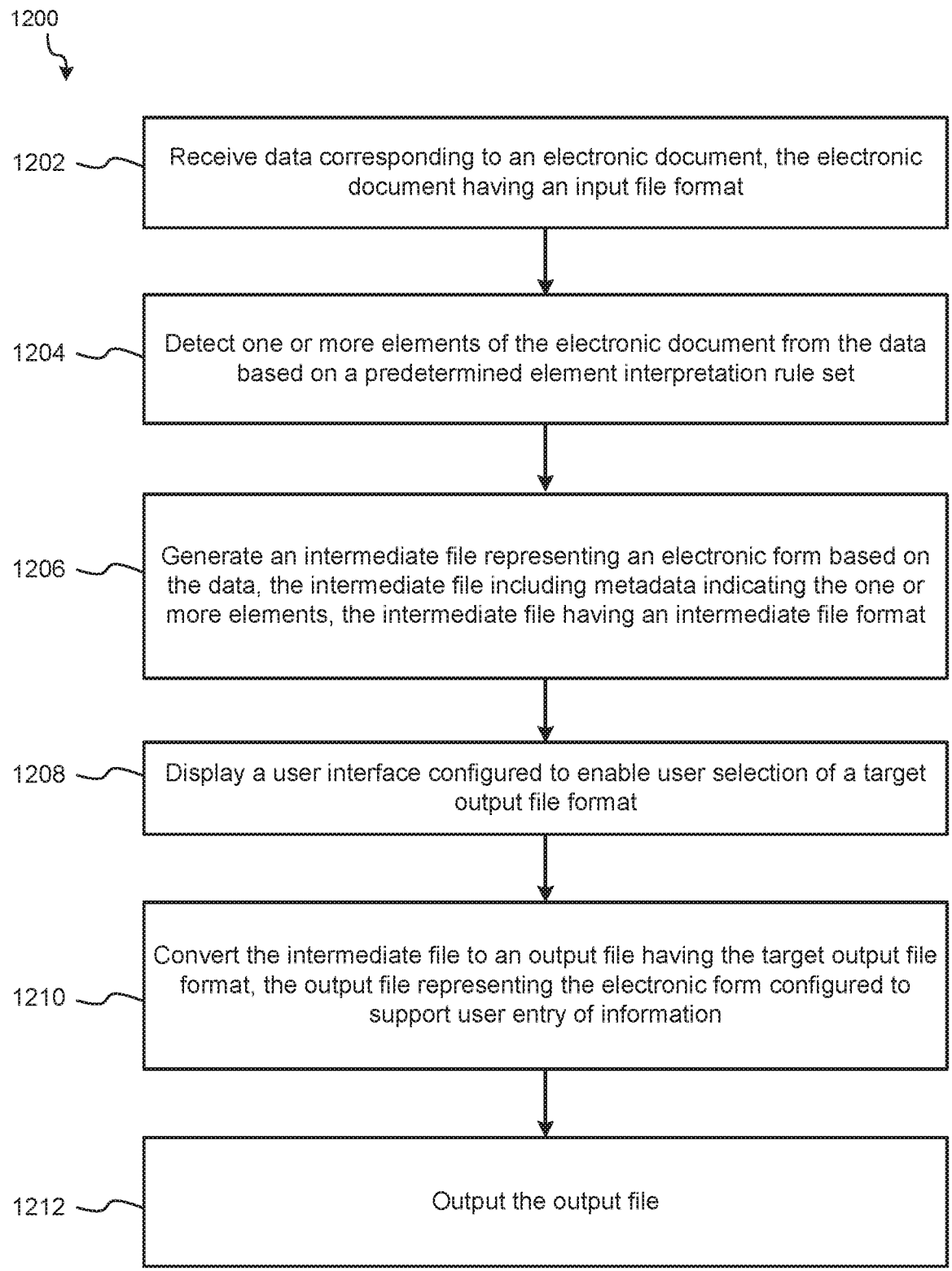
FIG. 12 shows is a flow chart of an example of a method of generating an electronic form from an electronic document according to some aspects of the present disclosure.

FIG. 12 is a flow diagram of a method 1200 of generating an electronic form from an electronic document according to some aspects of the present disclosure. In some implementations, the method 1200 may be performed by system 100 of FIG. 1, based on electronic document 300 of FIG. 3, to generate electronic form 1100 of FIG. 11.

Method 1200 includes receiving data corresponding to an electronic document, at 1202. The electronic document may have an input file format. For example, server 110 may receive an electronic document from data sources 170 via network 180. The received electronic document may have an input file format. Method 1200 also includes detecting one or more elements of the electronic document from the data based on a predetermined element interpretation rule set, at 1204. For example, element detector 120 may detect one or more elements of the electronic document based on predetermined element interpretation rule set 121.

Method 1200 includes generating an intermediate file representing an electronic form based on the data, at 1206. The intermediate file may include metadata indicating the one or more elements, and the intermediate file may have an intermediate file format. For example, intermediate electronic form generator 122 may generate an intermediate file that represents an electronic form and that includes the one or more elements detected by element detector 120. The intermediate file may have an intermediate file format. Method 1200 also includes displaying a user interface configured to enable user selection of a target output file format, at 1208. For example, UI manager 125 may initiate display of fifth UI 800 of FIG. 8.

Method 1200 includes converting the intermediate file to an output file having the target output file format, at 1210. The output file may represent the electronic form configured to support user entry of information. For example, file converter 124 may convert the intermediate file generated by intermediate electronic form generator 122 to an output file having the target output file format. The output file may represent the electronic form, configured in accordance with one or more rules or protocols associated with the target output file format. Method 1200 further includes outputting the output file, at 1212. For example, file converter 124 may output the output file for storage, either at server 110 or another device, or for distribution to one or more other devices.

In some implementations, the data does not include (e.g., omits) metadata indicating one or more predefined elements of the electronic document. For example, the electronic document may include or correspond to a scanned document or a document generated by a word processing or document management application that does not generate metadata indicating elements of the document. Additionally or alternatively, the one or more elements may include one or more labels, one or more fields, one or more text blocks, one or more tables, one or more buttons, one or more check boxes, one or more date fields, one or more time fields, one or more currency fields, one or more signature fields, or a combination thereof. For example, electronic document 300 may include labels, fields, text blocks, tables, buttons, check boxes, date fields, time fields, currency fields, signature fields, other elements, or a combination thereof. Additionally or alternatively, the predetermined element interpretation rule set may include visual indicator detection rules, element dimension or size rules, label threshold rules, table detection rules, repeating table detection rules, configurable element detection rules, signature detection rules, or a combination thereof. For example, predetermined element interpretation rule set 121 may include the rules described with reference to FIGS. 1-2.

In some implementations, method 1200 also includes, prior to detecting the one or more elements of the electronic document, displaying a second user interface configured to enable user selection of one or more parameters associated with detection of the one or more elements. For example, UI manager 125 may initiate display of second UI 500 of FIGS. 5A-B. The one or more parameters may include one or more dimensions of input fields, one or more label thresholds, a type of indicator associated with the input fields, or a combination thereof. For example, second UI 500 includes parameters associated with reader settings tab 520 and vision settings tab 522.

In some implementations, method 1200 also includes, after generating the intermediate file, displaying a third user interface configured to enable user configuration of the electronic form represented by the intermediate file. For example, UI manager 125 may initiate display of fourth UI 700 of FIG. 7. The third user interface may include an add option configured to add a field, an element, a control, or a combination thereof, to the electronic form, an edit option configured to edit one or more properties associated with one or more fields, one or more elements, one or more controls, or a combination thereof, included in the electronic form, a delete option configured to delete one or more fields, one or more elements, one or more controls, or a combination thereof, included in the electronic form, or a combination thereof. For example, display pane 712 and form element properties 716 may enable adding, modifying, or deleting one or more elements of the electronic form represented by the intermediate file.

In some implementations, detecting the one or more elements based on the predetermined element interpretation rule set may include detecting a particular type of input field based on one or more indicators in the electronic document corresponding to an input field and a label associated with the one or more indicators. The label may be located within a threshold distance of the one or more indicators in the electronic document. For example, element detector 120 may be configured to perform label detection, as described with reference to block 224, and field detection, as described with reference to block 226, of FIG. 2. Additionally or alternatively, detecting the one or more elements based on the predetermined element interpretation rule set may include detecting a table by detecting one or more boxes based on one or more rectangles or multiple sets of perpendicular lines included in the electronic document, determining a pattern associated with the one or more boxes in a horizontal direction, a vertical direction, or both, building a grid based on the pattern to represent the table, and determining one or more entries in the table based on text included in the one or more boxes, position of content included in the one or more boxes, controls included in the one or more boxes, or a combination thereof. For example, element detector 120 may be configured to perform table detection, as described with reference to block 230 of FIG. 2. In some such implementations, method 1200 further includes identifying the table as a repeating table based on one or more rows of empty entries or one or more rows having entries that include the same content, and generating a child data source corresponding to the repeating table in the intermediate file. For example, table detection may include detection and generation of a repeating table, as described with reference to block 230 of FIG. 2. Additionally or alternatively, the table may include a compound header generated based on a type of entries in a row of the table and descriptors included in entries of an adjacent row of the table.

In some implementations, the input file format includes a portable document format (PDF), and the target output file format includes an electronic form application file format. For example, server 110 may receive a PDF file (or other image data) corresponding to the electronic document, and file converter 124 may generate the output file having an open-source format, such as HTML, a proprietary format, such as Vines, or a third-party supported format, such as K2 or SharePoint, as non-limiting examples. Additionally or alternatively, the intermediate file format may include a uniform format that is convertible to multiple different output file formats. For example, the intermediate file generated by intermediate electronic form generator 122 may have a universal file format that is convertible to multiple different output file formats (e.g., electronic form application formats), such as based on one or more protocols, rulesets, or conversion algorithms associated with the output file formats.

In some implementations, method 1200 also includes initiating display of a fourth user interface configured to display measured results associated with generation of the intermediate file. The measured results may include a number of fields detected in the electronic document, a number of views detected in the electronic document, a percentage of detected views included in the electronic form, a percentage of detected fields included in the electronic form, a percentage of rules applied to generate the electronic form, a percentage of data sources linked to the electronic form, or a combination thereof. For example, UI manager 125 may initiate display of third UI 600 of FIG. 6. Additionally or alternatively, method 1200 may further include initiating display of a fifth user interface configured to display one or more errors associated with generation of the output file, one or more warnings associated with generation of the output file, one or more to-do lists associated with generation of the output file, or a combination thereof. For example, UI manager 125 may initiate display of seventh UI 1000 of FIG. 10.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

Functional blocks and modules in FIGS. 1-12 may comprise processors, electronics devices, hardware devices, electronics components, logical circuits, memories, software codes, firmware codes, etc., or any combination thereof. Consistent with the foregoing, various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal, base station, a sensor, or any other communication device. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method for converting legacy electronic forms and static electronic documents to web-fillable electronic forms, the method comprising:
    receiving data corresponding to an electronic document, the electronic document having an input file format, wherein the data includes scanned image data or word processing document data and does not include metadata indicating any predefined elements of the electronic document;
    detecting one or more elements of the electronic document from the data based on a predetermined element interpretation rule set, the predetermined element interpretation rule set including at least visual indicator detection rules for detection of graphical indicators of the one or more elements in the electronic document, the one or more elements including one or more labels, one or more fields, or one or more elements corresponding to user-configurable or interactive elements;
    generating an intermediate file representing an electronic form based on the data, the intermediate file including metadata indicating the one or more elements, the intermediate file having an intermediate file format, wherein generating the intermediate file includes converting a first text element of the one or more elements of the electronic document to a first user-configurable or interactive element within the electronic form;

displaying a form editing interface configured to enable user configuration of the electronic form represented by the intermediate file, the form editing interface configured to enable editing of locations and properties of content of the electronic form based on user input indicating selection and manipulation of the content;

displaying a user interface configured to enable user selection of a target output file format;

converting the intermediate file to an output file having the target output file format, the output file representing the electronic form configured to support user entry of information and including the first user-configurable or interactive element; and outputting the output file.

2. The method of claim 1, wherein converting the first text element to the first user-configurable or interactive element within the electronic form represented by the intermediate file comprises converting the first text element to a checkbox, a button, a dropdown menu, a pop-up clock, a pop-up calendar, or a digital signature field.

3. The method of claim 1, wherein the one or more elements further include one or more text blocks, one or more date fields, one or more time fields, one or more currency fields, one or more signature fields, or a combination thereof.

4. The method of claim 1, wherein the predetermined element interpretation rule set further includes element dimension or size rules for interpreting dimensions or sizes as indicative of the one or more elements in the electronic document and label threshold rules for detecting labels and applying the labels to fields in the electronic document based on distances between the labels and the fields.

5. The method of claim 1, further comprising, prior to detecting the one or more elements of the electronic document, displaying a second user interface configured to enable user selection of one or more parameters associated with automatic detection of the graphical indicators of the one or more elements within the electronic document, wherein the one or more parameters include one or more label thresholds associated with detection of labels of input fields and types of graphical indicators associated with detection of the input fields.

6. The method of claim 1, wherein the form editing interface includes an add option configured to add a field, an element, a control, or a combination thereof, to the electronic form, an edit option configured to edit one or more properties associated with one or more fields, one or more elements, one or more controls, or a combination thereof, included in the electronic form, a delete option configured to delete one or more fields, one or more elements, one or more controls, or a combination thereof, included in the electronic form, or a combination thereof.

7. The method of claim 1, wherein detecting the one or more elements based on the predetermined element interpretation rule set comprises detecting a particular type of input field based on one or more indicators in the electronic document corresponding to an input field and a label associated with the one or more indicators, the label located within a threshold distance of the one or more indicators in the electronic document.

8. The method of claim 1, wherein detecting the one or more elements based on the predetermined element interpretation rule set comprises detecting a table by:

detecting one or more boxes based on one or more rectangles or multiple sets of perpendicular lines included in the electronic document;

determining a pattern associated with the one or more boxes in a horizontal direction, a vertical direction, or both;

building a grid based on the pattern to represent the table; and determining one or more entries in the table based on text included in the one or more boxes, position of content included in the one or more boxes, controls included in the one or more boxes, or a combination thereof.

9. The method of claim 8, further comprising:

identifying the table as a repeating table based on one or more rows of empty entries or one or more rows having entries that include the same content; and generating a child data source corresponding to the repeating table in the intermediate file.

10. The method of claim 8, wherein the table includes a compound header generated based on a type of entries in a row of the table and descriptors included in entries of an adjacent row of the table.

11. An apparatus for converting legacy electronic forms and static electronic documents to web-fillable electronic forms, the apparatus comprising:

a processor; and a memory coupled to the processor and storing instructions executable by the processor to cause the processor to:

receive data corresponding to an electronic document, the electronic document having an input file format, wherein the data includes scanned image data or word processing document data and does not include metadata indicating any predefined elements of the electronic document;

detect one or more elements of the electronic document from the data based on a predetermined element interpretation rule set, the predetermined element interpretation rule set including at least visual indicator detection rules for detection of graphical indicators of the one or more elements in the electronic document, the one or more elements including one or more labels, one or more fields, or one or more elements corresponding to user-configurable or interactive elements;

generate an intermediate file representing an electronic form based on the data, the intermediate file including metadata indicating the one or more elements, the intermediate file having an intermediate file format, wherein the processor is configured to generate the intermediate file by converting a first text element of the one or more elements of the electronic document to a first user-configurable or interactive element within the electronic form;

initiate display of a form editing interface configured to enable user configuration of the electronic form represented by the intermediate file, the form editing interface configured to enable editing of locations and properties of content of the electronic form based on user input indicating selection and manipulation of the content;

initiate display of a user interface configured to enable user selection of a target output file format;

convert the intermediate file to an output file having the target output file format, the output file representing the electronic form configured to support user entry of information and including the first user-configurable or interactive element; and output the output file.

12. The apparatus of claim 11, further comprising:

a database coupled to the processor, the database configured to store intermediate files, output files, input files, the predetermined element interpretation rule set, or a combination thereof.

13. The apparatus of claim 11, further comprising:

an interface coupled to the processor and configured to enable communication with a data source that stores the data, an electronic device, or a combination thereof.

14. The apparatus of claim 11, wherein the input file format comprises an image file format or a word processing document file format, and wherein the target output file format comprises a smart form application file format that supports electronic completion of the electronic form, user interaction with the electronic form, and electronic submission functionality.

15. A non-transitory computer-readable medium storing instructions that, when executed by a processor, cause the processor to perform operations comprising:

receiving data corresponding to an electronic document, the electronic document having an input file format, wherein the data includes scanned image data or word processing document data and does not include metadata indicating any predefined elements of the electronic document;

detecting one or more elements of the electronic document from the data based on a predetermined element interpretation rule set, the predetermined element interpretation rule set including at least visual indicator detection rules for detection of graphical indicators of the one or more elements in the electronic document, the one or more elements including one or more labels, one or more fields, or one or more elements corresponding to user-configurable or interactive elements;

generating an intermediate file representing an electronic form based on the data, the intermediate file including metadata indicating the one or more elements, the intermediate file having an intermediate file format, wherein generating the intermediate file includes converting a first text element of the one or more elements of the electronic document to a first user-configurable or interactive element within the electronic form;

initiating display of a form editing interface configured to enable user configuration of the electronic form represented by the intermediate file, the form editing interface configured to enable editing of locations and properties of content of the electronic form based on user input indicating selection and manipulation of the content;

initiating display of a user interface configured to enable user selection of a target output file format;

converting the intermediate file to an output file having the target output file format, the output file representing the electronic form configured to support user entry of information and including the first user-configurable or interactive element; and outputting the output file.

16. The non-transitory computer readable medium of claim 15, wherein the operations further comprise initiating display of a fourth user interface configured to display measured results associated with generation of the intermediate file, the measured results including a total number of detected fields in the electronic document having the input file format that is successfully included in the electronic form represented by the intermediate file, a percentage of rules applied to generate the electronic form represented by the intermediate file from the electronic document having the input file format, a percentage of data sources linked to the electronic form represented by the intermediate file, or a combination thereof.

17. The non-transitory computer readable medium of claim 15, wherein the operations further comprise initiating display of a fifth user interface configured to display one or more warnings detected during successful generation of the output file and one or more to-do lists associated with the successful generation of the output file.

18. The non-transitory computer readable medium of claim 15, wherein the intermediate file format comprises a uniform format that is convertible to multiple different output file formats.

19. The method of claim 1, wherein detecting the one or more elements in the electronic document having the input file format comprises performing optical character recognition (OCR) on the data corresponding to the electronic document and detecting one or more objects or shapes in electronic document.

* * * * *